United States Patent
Yoshioka et al.

(10) Patent No.: US 10,337,467 B2
(45) Date of Patent: Jul. 2, 2019

(54) FULL-CLOSE ABNORMALITY DIAGNOSIS APPARATUS FOR FLOW CONTROL VALVE

(71) Applicant: AISAN KOGYO KABUSHIKI KAISHA, Obu-shi, Aichi-ken (JP)

(72) Inventors: Mamoru Yoshioka, Nagoya (JP); Takashige Inagaki, Obu (JP); Naruto Ito, Nisshin (JP); Toshiyuki Fujimura, Obu (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 0 days.

(21) Appl. No.: 15/782,332

(22) Filed: Oct. 12, 2017

(65) Prior Publication Data

US 2018/0106220 A1 Apr. 19, 2018

(30) Foreign Application Priority Data

Oct. 18, 2016 (JP) .................. 2016-204558

(51) Int. Cl.
*F02M 26/50* (2016.01)
*F02D 41/22* (2006.01)
(Continued)

(52) U.S. Cl.
CPC ......... *F02M 26/23* (2016.02); *F02D 41/0077* (2013.01); *F02D 41/221* (2013.01);
(Continued)

(58) Field of Classification Search
CPC ........ F02M 26/47; F02M 26/50; F02M 26/23; F02M 26/70; F02M 26/53; F02M 26/54; F02M 26/60; F02M 26/49; F02M 2026/003; F02M 2026/001; F16K 1/2021; F16K 1/24; F16K 1/221; F16K 31/041; F16K 31/002;
(Continued)

(56) References Cited

U.S. PATENT DOCUMENTS

| 6,164,270 A | * | 12/2000 | Bidner | .................... F02D 21/08 |
| | | | | 123/568.16 |
| 2004/0173182 A1 | * | 9/2004 | Hedrick | .................... F02D 9/02 |
| | | | | 123/396 |

(Continued)

FOREIGN PATENT DOCUMENTS

| JP | 2017-219191 A | 12/2017 |
| WO | 2016/002599 A1 | 1/2016 |

*Primary Examiner* — George C Jin
(74) *Attorney, Agent, or Firm* — Oliff PLC

(57) ABSTRACT

An EGR valve includes a valve seat in a flow passage of a housing, a valve element seatable on the valve seat, a rotary shaft to open or close the valve element, a motor and a speed reducing mechanism, a return spring urging the valve element in a valve closing direction, and an opening-degree sensor to detect an opening degree of the valve element. An electronic control unit (ECU) diagnoses abnormality due to lodging of foreign matter between the valve seat and the valve element during full close. When driving the motor to urge the valve element in the valve closing direction during full close of the valve element, the ECU determines the EGR valve to be abnormal because of lodging of foreign matter if a difference between a value detected by the opening-degree sensor and a predetermined reference value is larger than a first determination value.

5 Claims, 17 Drawing Sheets

(51) Int. Cl.

| | |
|---|---|
| *F02M 26/23* | (2016.01) |
| *F16K 1/20* | (2006.01) |
| *F16K 1/22* | (2006.01) |
| *F16K 1/24* | (2006.01) |
| *F16K 31/04* | (2006.01) |
| *F16K 37/00* | (2006.01) |
| *F02M 26/70* | (2016.01) |
| *F02M 26/49* | (2016.01) |
| *F02M 26/54* | (2016.01) |
| *F02D 41/00* | (2006.01) |
| *F02M 26/48* | (2016.01) |

(52) U.S. Cl.
CPC ............ *F02M 26/48* (2016.02); *F02M 26/49* (2016.02); *F02M 26/50* (2016.02); *F02M 26/54* (2016.02); *F02M 26/70* (2016.02); *F16K 1/2021* (2013.01); *F16K 1/221* (2013.01); *F16K 1/24* (2013.01); *F16K 31/041* (2013.01); *F16K 37/0083* (2013.01); *F02D 2200/0406* (2013.01); *F02D 2250/16* (2013.01)

(58) Field of Classification Search
CPC ......... F16K 37/0083; F02D 2009/0277; F02D 41/221
See application file for complete search history.

(56) References Cited

U.S. PATENT DOCUMENTS

| | | | |
|---|---|---|---|
| 2005/0155574 A1* | 7/2005 | Hedrick | ................ F02D 11/107 123/399 |
| 2017/0152953 A1 | 6/2017 | Misumi et al. | |

\* cited by examiner

LFB: LODGMENT OF FOREIGN MATTER

UU: UPPER LIMIT
MM: MEDIAN
LL: LOWER LIMIT

FULL-CLOSE ABNORMALITY DIAGNOSIS APPARATUS FOR FLOW CONTROL VALVE

CROSS-REFERENCE TO RELATED APPLICATIONS

This application is based upon and claims the benefit of priority from the prior Japanese Patent Application No. 2016-204558 filed on Oct. 18, 2016, the entire contents of which are incorporated herein by reference.

BACKGROUND

Technical Field

This disclosure relates to a flow control valve to be used to control a flow rate of a fluid and, more particularly, to a full-close abnormality diagnosis apparatus for diagnosing abnormality during full close.

Related Art

As one example of the above type of technique, there has been known an exhaust recirculation valve (EGR valve) including a double eccentric valve disclosed in WO 2016/002599. This double eccentric valve is designed to improve sealing property during full close and prevent wear due to rubbing between a valve element and a valve seat during rotation of the valve element. Specifically, the double eccentric valve is provided with the valve seat including a valve hole and a seat surface formed at an edge of the valve hole, the valve element formed with a seal surface on the outer circumference corresponding to the seat surface, a rotary shaft for rotating the valve element, a drive mechanism for driving the rotary shaft to rotate, and a bearing that supports the rotary shaft. The valve seat and the valve element are placed in a fluid flow passage formed in a housing. The flow passage is branched at the valve seat into an upstream-side passage and a downstream-side passage in a fluid flowing direction. The valve element is placed in the upstream-side passage. Further, the double eccentric valve is provided with an opening-degree sensor for detecting an opening degree of the valve element based on a rotation angle of the rotary shaft.

The above double eccentric valve is designed such that an urging force is applied to a drive mechanism side of the rotary shaft in order to press the valve element and a valve element side of the rotary shaft toward the valve seat about the bearing acting as a fulcrum. The rotary shaft is supported in the housing in a cantilever configuration in order to prevent the rotary shaft from becoming locked because of foreign matter or substance lodged, or caught, between the valve element and the valve seat during full close. This cantilever configuration allows somewhat bearing looseness between the valve element and the valve seat, i.e. inevitable assembling looseness between the bearing and the rotary shaft, derived from the bearing structure. Further, in order to prevent gas leakage from between the valve element and the valve seat during full close, the bearing looseness is utilized to allow the drive mechanism to bring the valve element in contact with the valve seat to provide a seal.

SUMMARY

Technical Problem

Meanwhile, in the EGR valve disclosed in WO 2016/002599, if a small foreign matter or substance is lodged between the valve element and the valve seat, the valve element may be displaced to a slightly open position. In some cases, however, the valve element returns to a fully closed position by just the assembling looseness such as the bearing looseness. In this case, some opening-degree sensors cannot detect a small opening degree formed by lodging of the foreign matter. Even when the foreign matter is large enough for the opening-degree sensor to detect lodging of such a foreign matter, the leakage amount of a fluid may be different according to the position of the foreign matter lodged or stuck on the valve seat, even at the same detected opening degree. This leads to large variations in relationship between an opening degree detected by the opening-degree sensor and the fluid leakage amount.

The above-mentioned abnormality due to lodging of foreign matter during full close is a problem that may occur not only in the EGR valve including the double eccentric valve but also in for example an EGR valve including a poppet valve or a fluid control valve for regulating a fluid other than EGR gas.

This disclosure has been made to address the above problems and has a purpose to provide a full-close abnormality diagnosis apparatus for a flow control valve, configured to properly diagnose abnormality due to foreign matter caught between the valve seat and the valve element in a fully closed state. This abnormality is hereinafter referred to as "foreign-matter lodging abnormality".

Means of Solving the Problem

To achieve the above purpose, one aspect of the present disclosure provides a full-close abnormality diagnosis apparatus for diagnosing abnormality in a flow control valve during full close, the flow control valve comprising: a housing including a flow passage; a valve seat provided in the flow passage; a valve element provided to be seatable on the valve seat; a drive unit configured to drive the valve element to open and close with respect to the valve seat; a valve-closing urging unit that urges the valve element in a valve closing direction by an elastic force; and an opening-degree detecting unit provided in the housing and configured to detect an opening degree of the valve element with respect to the valve seat, wherein the full-close abnormality diagnosis apparatus comprises an abnormality diagnosis unit configured to diagnose foreign-matter lodging abnormality in which foreign matter is lodged between the valve seat and the valve element during full close of the valve element, the abnormality diagnosis unit is configured to: drivingly control the drive unit to urge the valve element in the valve closing direction during full close of the valve element, and determine that the flow control valve is abnormal because of lodging of the foreign matter when a detection difference between a full-close detection value detected by the opening-degree detecting unit during driving control of the drive unit and a predetermined reference full-close detection value is larger than a predetermined determination value.

According to the present disclosure, it is possible to properly diagnose foreign-matter lodging abnormality during full close of the valve element, regardless of the presence of assembling looseness.

DETAILED DESCRIPTION OF THE EXEMPLARY EMBODIMENTS

First Embodiment

A detailed description of a first embodiment of a full-close abnormality diagnosis apparatus for a flow control valve, applied to an exhaust recirculation valve (EGR valve) for an exhaust recirculation apparatus (EGR apparatus) to be mounted in an engine, will now be given referring to the accompanying drawings. It is to be noted that the term "full-close" in the present disclosure represents a state of a valve element of a flow control valve located in a fully closed position, that is, during full close. For example, the term "full-close abnormality" means the abnormality occurring when the valve element of the flow control valve is in fully closed position or is fully closed.

Figure 1:
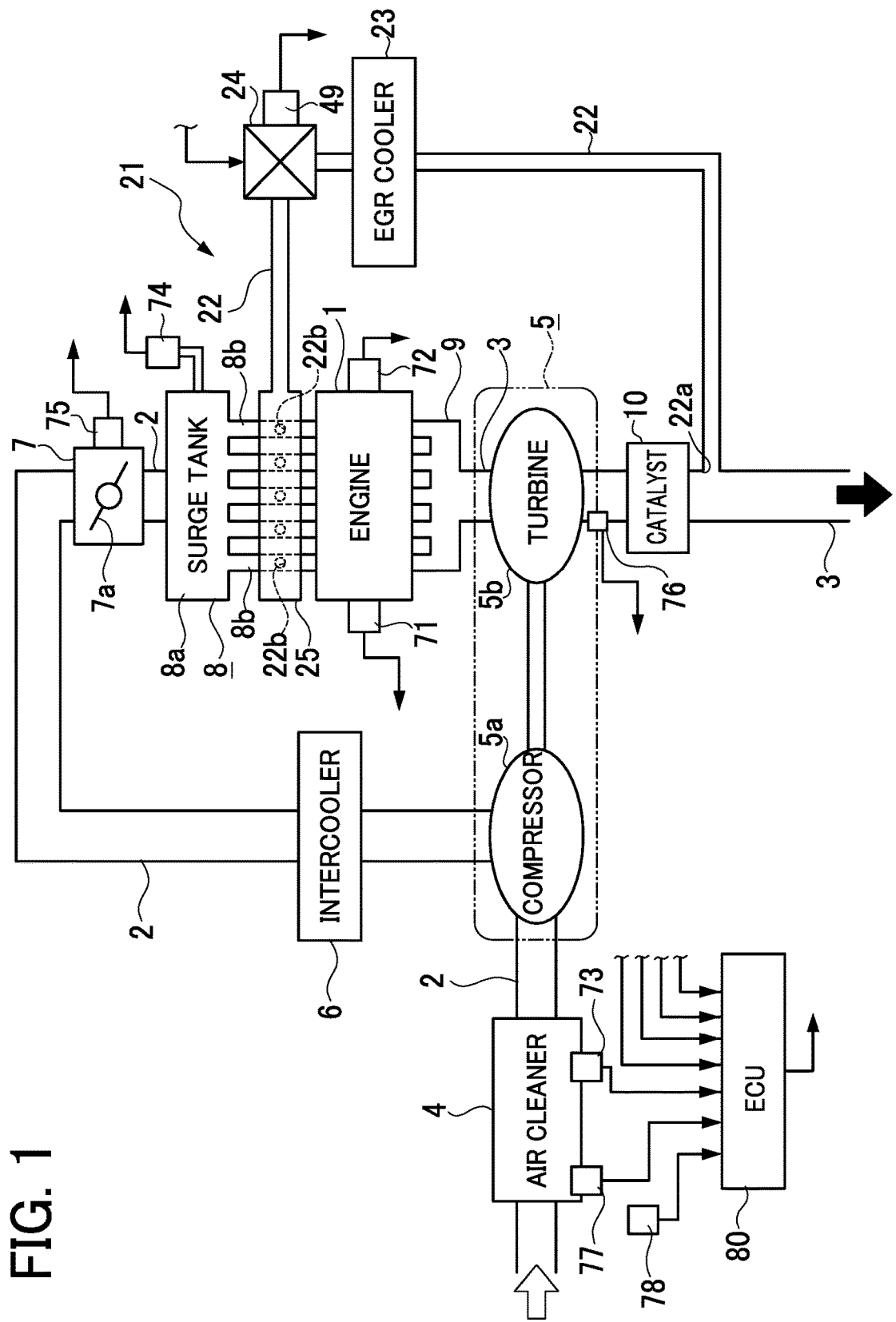
FIG. 1 is a schematic configuration view of a gasoline engine system in a first embodiment.

FIG. 1 is a schematic configuration view of a gasoline engine system in the present embodiment. This gasoline engine system mounted in a vehicle includes a reciprocal engine 1. The engine 1 is provided with an intake passage 2 through which intake air flows into each of cylinders and an exhaust passage 3 through which gas is exhausted from each of the cylinders. A supercharger 5 is provided in the intake passage 2 and the exhaust passage 3. In the intake passage 2, there are provided an air cleaner 4, a compressor 5a of the supercharger 5, an intercooler 6, a throttle device 7, and an intake manifold 8. The throttle device 7 is configured to adjust the amount of intake air in the intake passage 2 by opening and closing a butterfly-type throttle valve 7a. The intake manifold 8 includes a surge tank 8a and a plurality of branch pipes 8b extending in a branch form individually from the surge tank 8a to the cylinders of the engine 1. In the exhaust passage 3, there are provided an exhaust manifold 9, a turbine 5b of the supercharger 5, and a catalyst 10 for cleaning exhaust gas. The engine 1 is provided with a well-known structure to burn an air-fuel mixture containing fuel and intake air and, after burning, discharge exhaust gas to the exhaust passage 3. In the supercharger 5, the turbine 5b is operated to rotate by a flow of the exhaust gas and the compressor 5a is rotated in association therewith, thereby increasing the pressure of intake air in the intake passage 2.

The gasoline system is provided with an EGR device 21. This device 21 includes an exhaust gas recirculation passage (EGR passage) 22 for allowing part of the exhaust gas discharged from the engine 1 to the exhaust passage 3 to flow as exhaust recirculation gas (EGR gas) into the intake passage 2, an exhaust gas recirculation cooler (EGR cooler) 23 provided in the EGR passage 22 and used to cool the EGR gas, and an EGR valve 24 provided in the EGR passage 22, downstream of the EGR cooler 23, and used to adjust a flow rate of the EGR gas. The EGR valve 24 corresponds to one example of a flow control valve in this disclosure. The EGR passage 22 includes an inlet 22a and a plurality of outlets 22b. A downstream part of the EGR passage 22 is provided with an EGR distribution pipe 25 having the plurality of outlets 22b. The EGR distribution pipe 25 is placed in branch passages 8b of the intake manifold 8. In this embodiment, the inlet 22a of the EGR passage 22 is connected to a part of the exhaust passage 3, downstream of the catalyst 10. In this embodiment, the plurality of outlets 22b of the EGR pipe 25 are communicated in a one-to-one correspondence with the branch passages 8b in order to uniformly supply EGR gas to the cylinders.

In the present embodiment, the EGR valve 24 consists of an electrically-operated valve with an adjustable opening degree. Preferably, the EGR valve 24 has high flow, fast response, and high resolution properties. Therefore, this embodiment can adopt, as a basic structure of the EGR valve 24, the structure of a "double eccentric valve" disclosed in e.g. Japanese Patent No. 5759646. This double eccentric valve is configured to address high-flow control.

Figure 2:
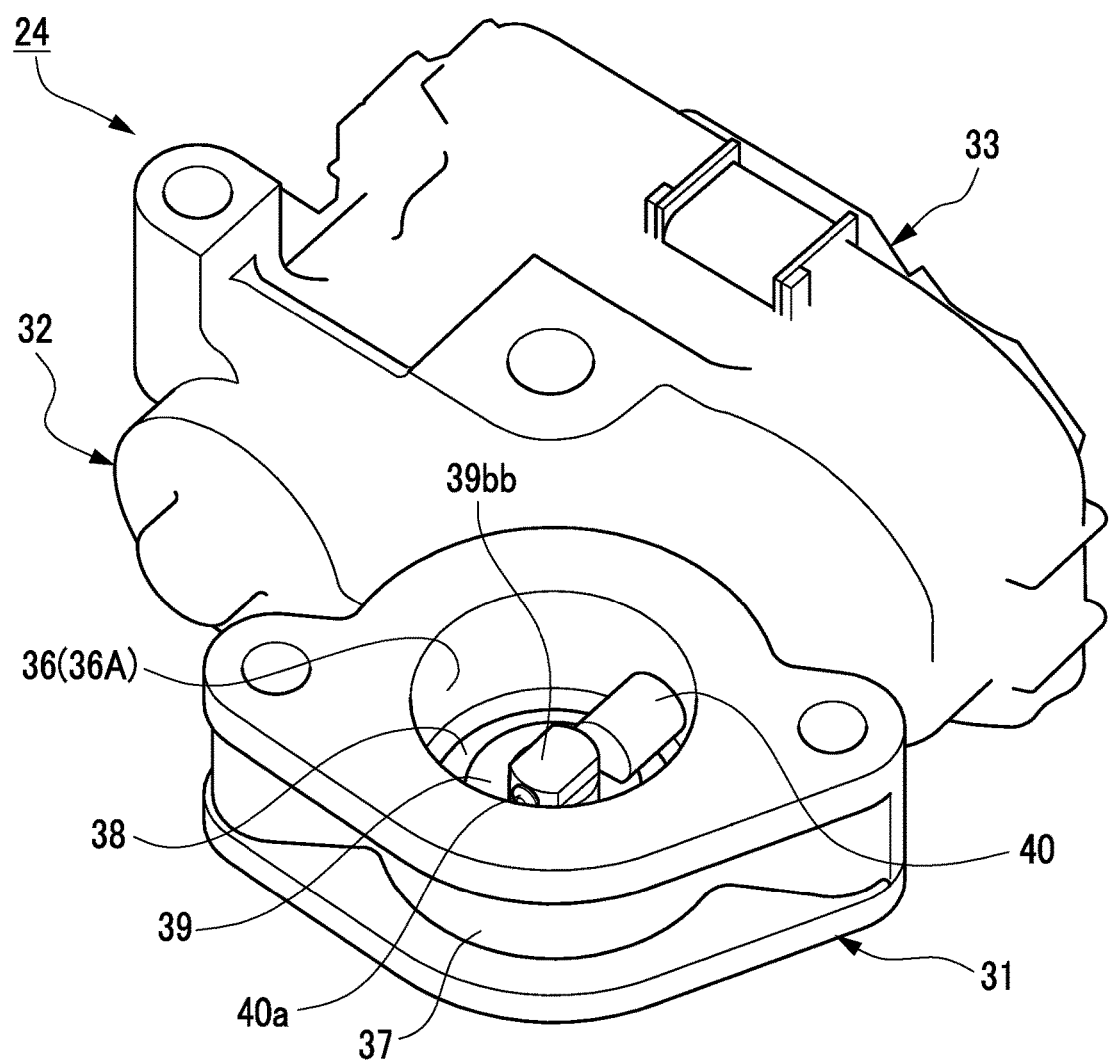
FIG. 2 is a perspective view of an EGR valve including a double eccentric valve in the first embodiment.

The basic structure of the electrically-operated EGR valve 24 including the double eccentric valve will be described in detail here. FIG. 2 is a perspective view of the EGR valve 24 including the double eccentric valve. The EGR valve 24 is provided with a valve section 31 consisting of the double eccentric valve, a motor section 32 internally containing a DC motor 42 (see FIG. 5), and a speed reducing mechanism section 33 internally containing a speed reducing mechanism 43 (see FIG. 5). The valve section 31 includes a pipe part 37 having a flow passage 36 through which EGR gas flows. In the flow passage 36, a valve seat 38, a valve element 39, and a distal end portion of a rotary shaft 40 are arranged. The rotary shaft 40 receives a torque of the DC motor 42 via the speed reducing mechanism 43. The rotary shaft 40, the DC motor 42, and the speed reducing mechanism 43 correspond to one example of a drive unit in the present disclosure.

Figure 3:
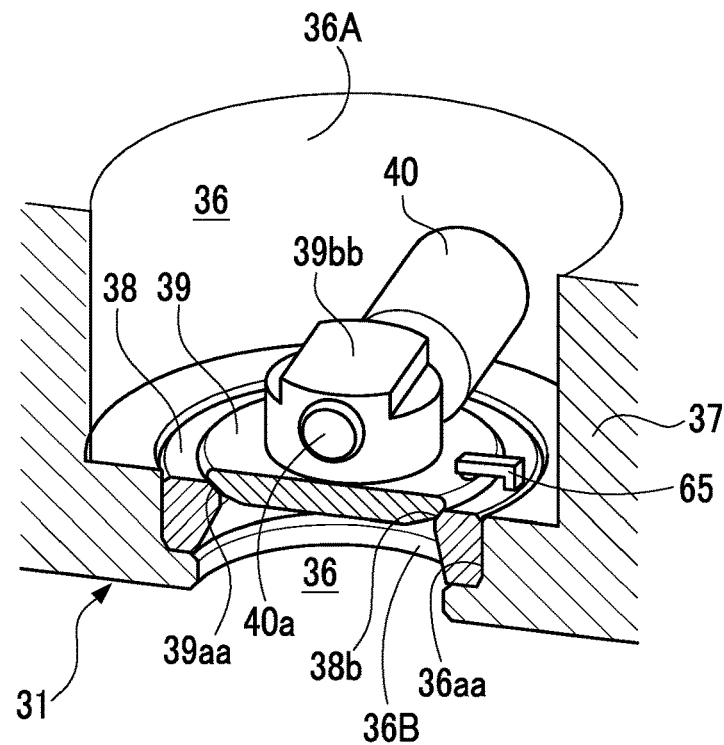
FIG. 3 is a partially cutaway perspective view of a valve section in a fully closed state in the first embodiment.
Figure 4:
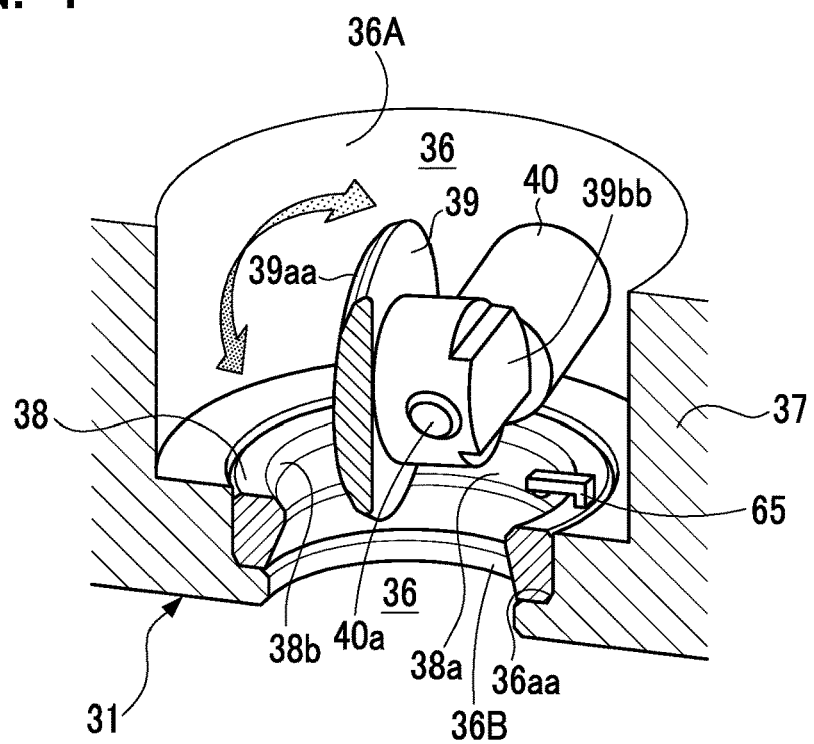
FIG. 4 is a partially cutaway perspective view of the valve section in a fully open state in the first embodiment.

FIG. 3 is a partially cutaway perspective view of the valve section 31 in a fully closed state in which the valve element 39 is seated on the valve seat 38, that is, the valve element 39 is disposed in a fully closed position. FIG. 4 is a partially cutaway perspective view of the valve section 31 in a fully open state in which the valve element 39 is farthest away from the valve seat 38, that is, the valve element 39 is disposed in a fully open position. As shown in FIGS. 3 and 4, the flow passage 36 is formed with a recessed shoulder 36aa in which the valve seat 38 is fitted. The valve seat 38 has a circular ring shape formed with a valve hole 38a at the center. The valve seat 38 is formed, at the circumferential edge of the valve hole 38a, with an annular seat surface 38b. The valve element 39 has a circular disc shape, formed on its outer periphery with an annular seal surface 39aa corresponding to, that is, to be brought into contact with, the seat surface 38b. The valve element 39 is fixed to the distal end portion of the rotary shaft 40 so as to be rotatable together with the rotary shaft 40. In FIGS. 3 and 4, the flow passage 36 includes an upstream-side passage 36A and a downstream-side passage 36B partitioned at the valve seat 38. In FIGS. 3 and 4, the flow passage 36 above the valve seat 38 represents the upstream-side passage 36A for a flow of EGR gas, while the flow passage 36 below the valve seat 38 represents the downstream-side passage 36B for a flow of EGR gas. The valve element 39 is placed in the upstream-side passage 36A. In the present embodiment, the upstream-side passage 36A is on an "exhaust side" continuous to the exhaust passage 3 via the EGR passage 22, and the downstream-side passage 36B is on an "intake side" continuous to the intake passage 2 (the intake manifold 8) via the EGR passage 22.

Figure 5:
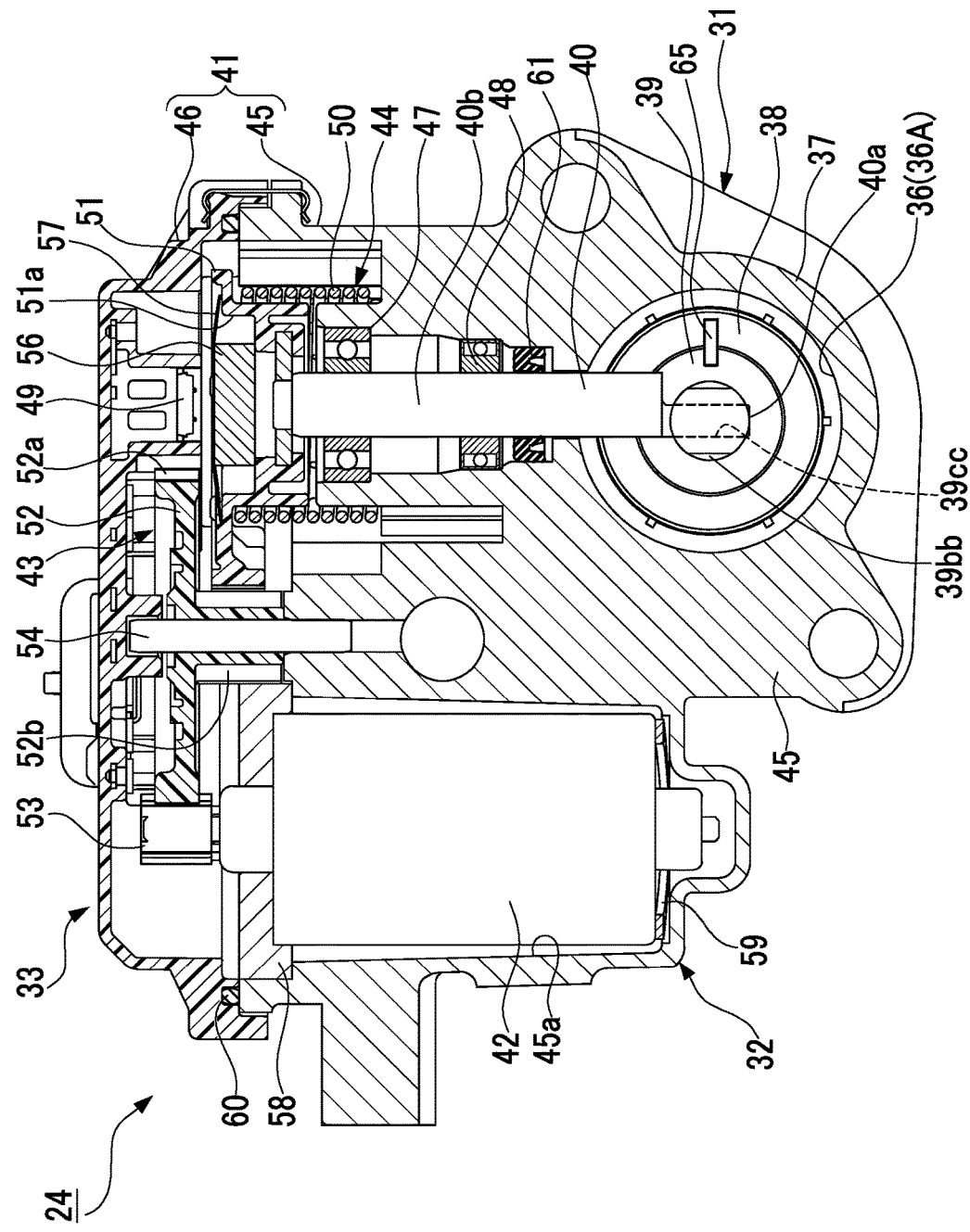
FIG. 5 is a flat cross sectional view of an EGR valve in a fully closed state in the first embodiment.

FIG. 5 is a flat cross sectional view of the EGR valve 24 in a fully closed state. As shown in FIG. 5, this EGR valve 24 is provided, as main components, with a housing 41, the DC motor 42, the speed reducing mechanism 43, and a returning mechanism 44 as well as the valve seat 38, the valve element 39, and the rotary shaft 40. The housing 41 includes a valve housing 45 made of aluminum including the pipe part 37 and others, and an end frame 46 made of synthetic resin, or plastic, closing an open end of the valve housing 45. The rotary shaft 40, the valve seat 38, and the valve element 39 are placed in the valve housing 45. Specifically, the rotary shaft 40 is provided with a pin 40a to attach the valve element 39 at the distal end portion of the rotary shaft 40. The distal end portion of the rotary shaft 40 including the pin 40a is a free end portion placed together with the valve element 39 in the upstream-side passage 36A. In the present embodiment, in the upstream-side passage 36A, the valve element 39 and the distal end portion of the rotary shaft 40 are placed, and the valve element 39 is seatable on the valve seat 38. Further, the rotary shaft 40 has a base end portion 40b on a side opposite the pin 40a and is supported in a cantilever configuration at the base end portion 40b with respect to the valve housing 45. The base end portion 40b of the rotary shaft 40 is rotatably supported by the valve housing 45 through two bearings spaced from each other, that is, a first bearing 47 and a second bearing 48. A rubber seal 61 is placed adjacent to the second bearing 48 and between the rotary shaft 40 and the valve housing 45. Each of the first bearing 47 and the second bearing 48 consists of a ball bearing. The valve element 39 includes a protruding portion 39bb protruding upward (toward the upstream-side passage 36A) along its axis line L2 (see FIG. 6). The protruding portion 39bb is formed with a pin hole 39cc. The valve element 39 is fixed to the rotary shaft 40 in such a manner that the pin 40a is press-fitted in the pin hole 39cc and then welded to the valve element 39. In the present embodiment, the rotary shaft 40 is supported in a cantilever configuration with respect to the valve housing 45 through the bearings 47 and 48, thereby allowing somewhat bearing looseness (in micron units) between the valve element 39 and the valve seat 38, i.e. inevitable assembling looseness between each of the bearings 47 and 48 and the rotary shaft 40, derived from the structure of the bearings 47 and 48.

In FIG. 5, the end frame 46 is fixed to the valve housing 45 with a plurality of clips (not shown). Inside the end frame 46, an opening-degree sensor 49 is placed in correspondence with the base end of the rotary shaft 40 and used to detect an opening degree (a valve opening degree) of the valve element 39. The opening-degree sensor 49 corresponds to one example of an opening-degree detecting unit in the present disclosure. Furthermore, a main gear 51 is fixed to the base end portion 40b of the rotary shaft 40. A return spring 50 is provided between the main gear 51 and the valve housing 45 to urge the valve element 39 to rotate in a valve closing direction ("rotation urging operation"). The urging force of the return spring 50 can be estimated to be about 100 kPa, which can act against a front-rear differential pressure, which is a differential pressure between a front side and a rear side of the valve element 39 and acts to open the fully closed valve element 39. The return spring 50 constitutes the returning mechanism 44 and corresponds to one example of a valve-closing urging unit configured to urge a valve element in a valve closing direction in the present disclosure. The main gear 51 is formed, on its back side, with a recess 51a in which a magnet 56 is mounted. This magnet 56 is fixedly held down from above by a pressure plate 57. Thus, as the main gear 51 rotates integrally with the valve element 39 and the rotary shaft 40, the magnetic field of the magnet 56 changes. The opening-degree sensor 49 detects this change of magnetic field as a valve opening degree.

The DC motor 42 is housed in a holding cavity 45a formed in the valve housing 45 as shown in FIG. 5. Specifically, the DC motor 42 is fixed, in the holding cavity 45a, to the valve housing 45 via a stopper plate 58 and a leaf spring 59. The DC motor 42 is drivingly linked to the rotary shaft 40 via the speed reducing mechanism 43 to open or close the valve element 39. To be concrete, a motor gear 53 fixed on an output shaft (not shown) of the DC motor 42 is drivingly coupled to the main gear 51 via an intermediate gear 52. This intermediate gear 52 has a double gear structure consisting of a large-diameter gear 52a and a small-diameter gear 52b. The intermediate gear 52 is rotatably supported by the valve housing 45 via a pin shaft 54. The large-diameter gear 52a is connected to the motor gear 53, while the small-diameter gear 52b is connected to the main gear 51. In the present embodiment, the gears 51 to 53 constitute the speed reducing mechanism 43. The main gear 51 and the intermediate gear 52 are each made of resin material for weight saving. A rubber gasket 60 is provided between joint portions of the valve housing 45 and the end frame 46. With the gasket 60, the inside of the motor section 32 and the inside of the speed reducing mechanism section 33 are hermetically sealed from outside atmosphere.

Accordingly, when the DC motor 42 is activated, rotating the motor gear 53, from the fully closed state of the valve element 39 shown in FIG. 3, the rotation is reduced in speed by the intermediate gear 52 and then transmitted to the main gear 51. This causes the rotary shaft 40 and the valve element 39 to rotate against the urging force of the return spring 50, thereby opening the flow passage 36. That is, the valve element 39 is opened. In contrast, when the valve element 39 is to be closed, the DC motor 42 causes the motor gear 53 to rotate in a reverse direction. To keep the valve element 39 at a certain opening degree, the DC motor 42 is driven to generate a torque, which is transmitted as holding power to the rotary shaft 40 via the motor gear 53, the intermediate gear 52, and the main gear 51. When this holding power balances out about the urging force of the return spring 50, the valve element 39 is held at the certain opening degree.

In the EGR valve 24 in the present embodiment here, in the fully closed state shown in FIG. 3, excessive supercharging pressure may act on the downstream-side passage 36B from the intake passage 2. In this case, the valve element 39 may be floated, or separated, from the valve seat 38, causing intake air to leak into the upstream-side passage 36A and then flow to the exhaust passage 3. This may result in some defects due to intake air in the exhaust passage 3. The floating of the valve element 39 is possibly caused because the rotary shaft 40 is supported with respect to the valve housing 45 through the two bearings 47 and 48 structurally having the bearing looseness in micron units. Therefore, the EGR valve 24 is provided with a structure to prevent the floating of the valve element 39 caused by action of excessive supercharging pressure during full close.

Figure 6:
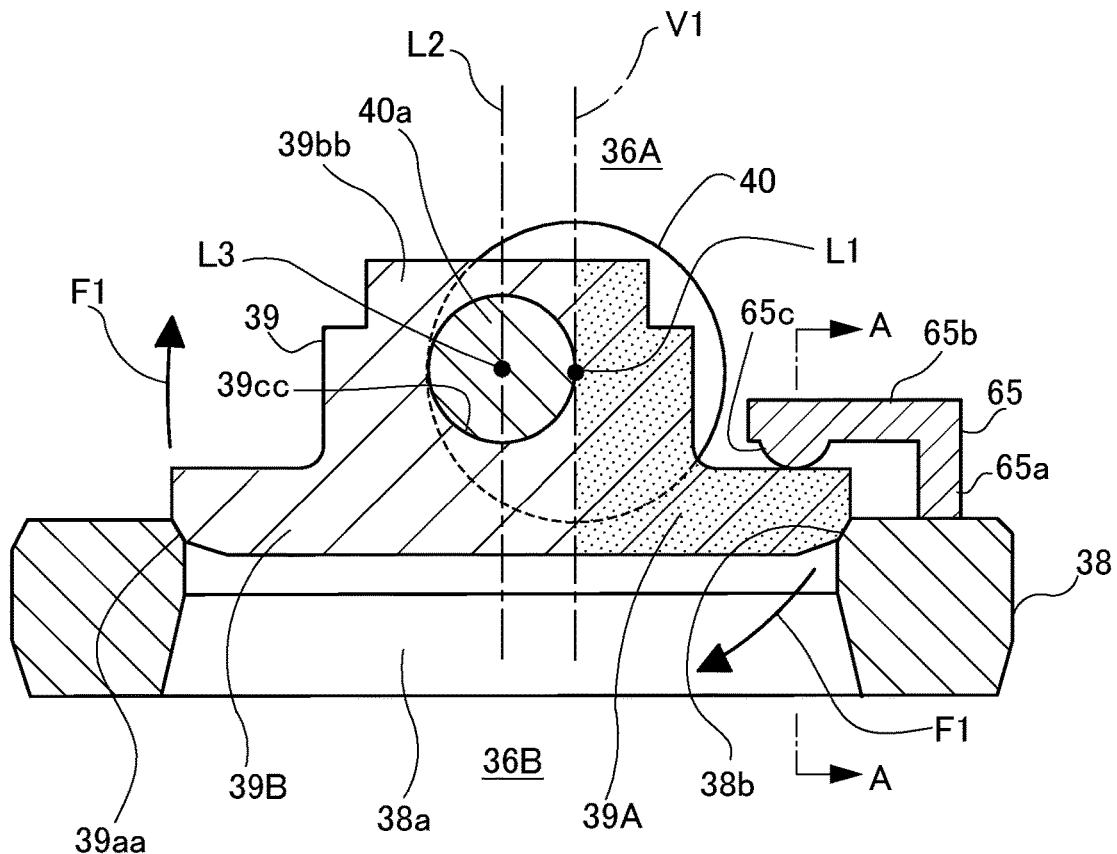
FIG. 6 is a cross sectional view showing a relationship between a valve seat, a valve element, and a rotary shaft in the fully closed state in the first embodiment.

FIG. 6 is a cross sectional view showing a relationship between the valve seat 38, the valve element 39, and the rotary shaft 40 in the fully closed state. In FIG. 6, an axis line (a primary axis line) L1 of the rotary shaft 40 is arranged apart from the seal surface 39aa of the valve element 39 and also apart from the axis line L2 of the valve element 39. Here, an axis line (a secondary axis line L3) of the pin 40a of the rotary shaft 40 extends in parallel with the primary axis line L1 and is arranged to be eccentric from the primary axis line L1 outwardly in a radial direction of the rotary shaft 40. The valve element 39 includes a first side part 39A (a part hatched with dots in FIG. 6) and a second side part 39B (a part hatched with no dots in FIG. 6) partitioned at a virtual face V1 extending on the primary axis line L1 and in parallel with an extending direction of the axis line L2 of the valve element 39. Further, when the valve element 39 is rotated from the fully closed position to open in a valve opening direction F1 (clockwise in FIG. 6) about the primary axis line L1 of the rotary shaft 40, the first side part 39A is rotated toward the downstream-side passage 36B and the second side part 39B is rotated toward the upstream-side passage 36A. When the valve element 39 is to be closed from the open state to the fully closed state, it is rotated in a valve closing direction (counterclockwise in FIG. 6) opposite to the valve opening direction F1.

Figure 7:
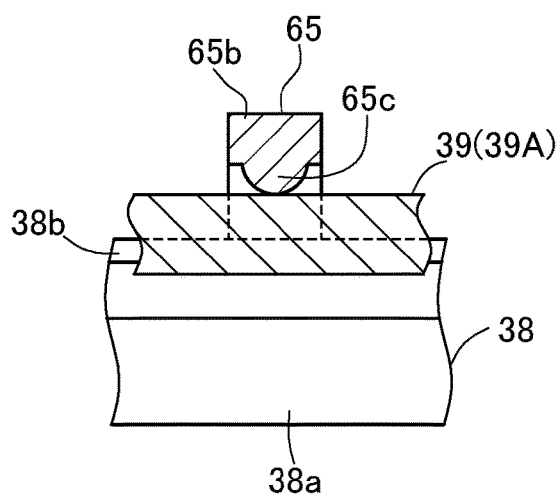
FIG. 7 is a cross sectional view of the valve seat, the valve element, and others, taken along a line A-A in FIG. 6 in the first embodiment.

Based on the aforementioned arrangement relationship between the valve seat 38, the valve element 39, and the rotary shaft 40, as shown in FIGS. 3 to 6, the valve seat 38 is provided with a valve-closing stopper 65 to restrain the valve element 39 in a fully closed state from rotating in a valve closing direction opposite to the valve opening direction F1. The valve-closing stopper 65 is provided for engagement with an upper surface of the first side part 39A of the valve element 39. The valve-closing stopper 65 has an L shape including a short-side portion 65a and a long-side portion 65b. The short-side portion 65a is fixed on the upper surface of the valve seat 38 and the long-side portion 65b extends to allow the upper surface of the first side part 39A to engage therewith. In the present embodiment, the valve-closing stopper 65 can be fixed to the valve seat 38 for example by welding. FIG. 7 is a cross sectional view of the valve seat 38, the valve element 39, and others, taken along a line A-A in FIG. 6. As shown in FIGS. 6 and 7, the long-side portion 65b of the valve-closing stopper 65 is integrally formed with a protrusion 65c having a semispherical convex surface. In the present embodiment, while the valve element 39 is in a fully closed state, when the return spring 50 urges the valve element 39 to rotate in the valve closing direction, the upper surface of the first side part 39A gets engaged with the protrusion 65c of the valve-closing stopper 65.

Next, one example of an electric structure of the gasoline engine will be described. In FIG. 1, various types of sensors 71 to 77 provided in the gasoline engine system constitute an operating state detecting unit for detecting an operating state of the engine 1. The water temperature sensor 71 provide in the engine 1 detects temperature THW of cooling water (cooling-water temperature) flowing through the inside of the engine 1 and outputs an electric signal representing its detection value. The rotation speed sensor 72 provided in the engine 1 detects rotational speed NE of a crank shaft (engine rotation speed) and outputs an electric signal representing its detection value. The air flowmeter 73 provided in the air cleaner 4 detects an intake amount Ga of air flowing through the air cleaner 4 and outputs an electric signal representing its detection value. The intake pressure sensor 74 provided in the surge tank 8a detects intake pressure PM in the intake passage 2 downstream from the throttle device 7 and outputs an electric signal representing its detection value. The throttle sensor 75 provided in the throttle device 7 detects an opening degree TA of the throttle valve 7a (throttle opening degree) and outputs an electric signal representing its detection value. The oxygen sensor 76 provided in the exhaust passage 3 between the turbine 5b and the catalyst 10 detects oxygen concentration Ox in exhaust gas and outputs an electric signal representing its detection value. The intake temperature sensor 77 provided at the inlet of the air cleaner 4 detects temperature THA of outside air to be sucked into the air cleaner 4 (intake temperature) and outputs an electric signal representing its detection value. Further, a vehicle in the present embodiment is provided with the atmospheric pressure sensor 78 to detect atmospheric pressure PA. This atmospheric pressure sensor 78 outputs an electric signal representing its detection value of the atmospheric pressure PA.

The above-mentioned gasoline engine system is further provided with an electronic control unit (ECU) 80 responsible for control of the relevant system. To this ECU 80, the various types of sensors 49 and 71 to 78 are individually connected. In addition to the EGR valve 24, injectors (not shown) and ignition coils (not shown) are also connected to the ECU 80. The ECU 80 corresponds to one example of an abnormality diagnosis unit in the present disclosure. The ECU 80, as well known, includes a central processing unit (CPU), various memories, an external input circuit and an external output circuit, and others. The memories store predetermined control programs for various controls. The CPU is configured to execute fuel injection control, igniting timing control, EGR control, full-close abnormality diagnosis control of the EGR valve, and other controls based on the predetermined control programs in response to the detection signals of the various sensors 49 and 71 to 78 transmitted through the input circuit.

In the present embodiment, the ECU 80 controls the EGR valve 24 according to the operating state of the engine 1 in the EGR control. To be concrete, the ECU 80 controls the EGR valve 24 to fully close during stop of the engine 1, during idling, during decelerating operation, and during accelerating operation. During other operations, the ECU 80 determines a target EGR opening degree according to each operating state and controls the EGR valve 24 to the target EGR opening degree. At that time, the EGR valve 24 is opened, allowing part of exhaust gas discharged from the engine 1 to the exhaust passage 3 and passed through the catalyst 10 to flow as EGR gas to the intake passage 2 (the intake manifold 8) via the EGR passage 22, the EGR valve 24, the EGR distribution pipe 25, and others, and return to each cylinder of the engine 1.

Figure 8:
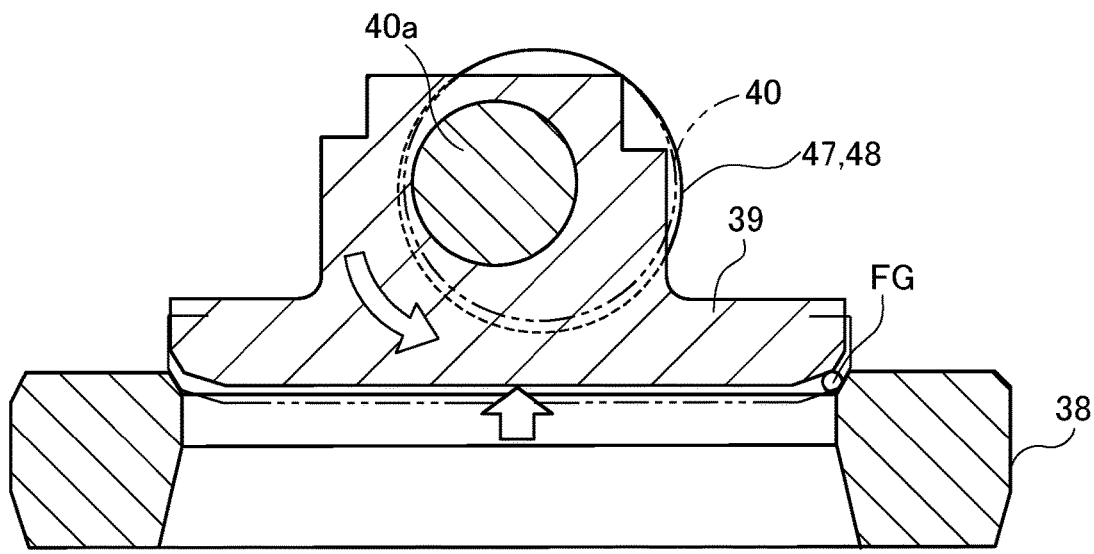
FIG. 8 is a cross sectional view showing that foreign matter is lodged between the valve seat and the valve element during full close, in which the valve seat is provided with no valve-closing stopper in the first embodiment.

Here, the following study is made on the EGR valve 24 during full close, lodging of foreign matter between the valve seat 38 and the valve element 39 and leakage amount of EGR gas or intake air. FIG. 8 is a cross sectional view showing that a foreign matter FG is lodged, or caught, between the valve seat 38 and the valve element 39 during full close, in which the valve-closing stopper 65 is not provided in the valve seat 38. In FIG. 8, a chain double-dashed line indicates the position of the valve element 39 with no foreign matter lodged. As shown in FIG. 8, if a small foreign matter FG is lodged between the valve seat 38 and the valve element 39, the valve element 39 is floated or separated from the valve seat 38 by just the bearing looseness. The valve element 39 is thus slightly opened. In this state, however, the valve element 39 may return to a fully closed position within the range of bearing looseness and thus the opening-degree sensor 49 (see FIG. 5) may not detect a minute opening degree resulting from lodging of such a foreign matter FG. Even if the foreign matter FG is large to a certain extent enough for the opening-degree sensor 49 to detect lodging of this foreign matter FG, the leakage amount of EGR gas or intake air may be different according to the lodging position of the foreign matter FG, or the position on the valve seat 38, even at the same opening degree is detected by the opening-degree sensor 49. This leads to large variations in the relationship between the opening degree detected by the opening-degree sensor 49 and the leakage amount.

Figure 9:
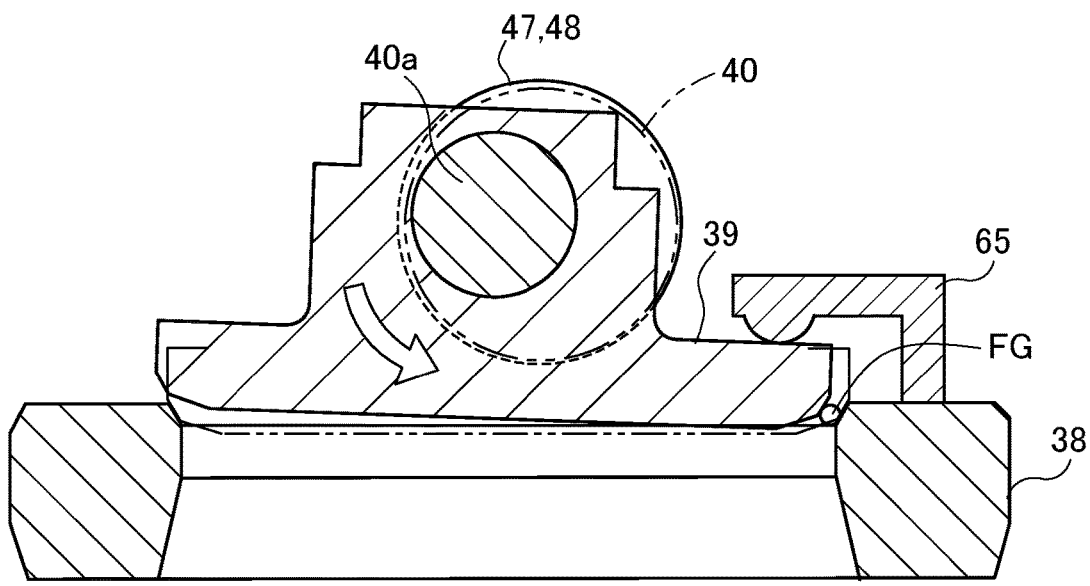
FIG. 9 is a cross sectional view showing that foreign matter is lodged between the valve seat and the valve element during full close, in which the valve seat is provided with a valve-closing stopper in the first embodiment.

In contrast, FIG. 9 is a cross sectional view showing that a foreign matter FG is caught between the valve seat 38 and the valve element 39 during full close, in which the valve-closing stopper 65 is provided in the valve seat 38. In FIG. 9, a chain double-dashed line indicates the position of the valve element 39 with no foreign matter lodged. As shown in FIG. 9, if a foreign matter FG is lodged between the valve seat 38 and the valve element 39, the valve element 39 is inclined clockwise about the valve-closing stopper 65 as a fulcrum. The opening-degree sensor 49 can detect this inclination as a change in opening degree of the valve element 39. The valve element 39 is pressed against the valve-closing stopper 65 serving as a fulcrum even if the foreign matter FG is minute, the valve element 39 is not floated or separated by just an amount corresponding to the bearing looseness and thus lodging of the foreign matter FG is found in an opening degree detected by the opening-degree sensor 49.

Figure 10:
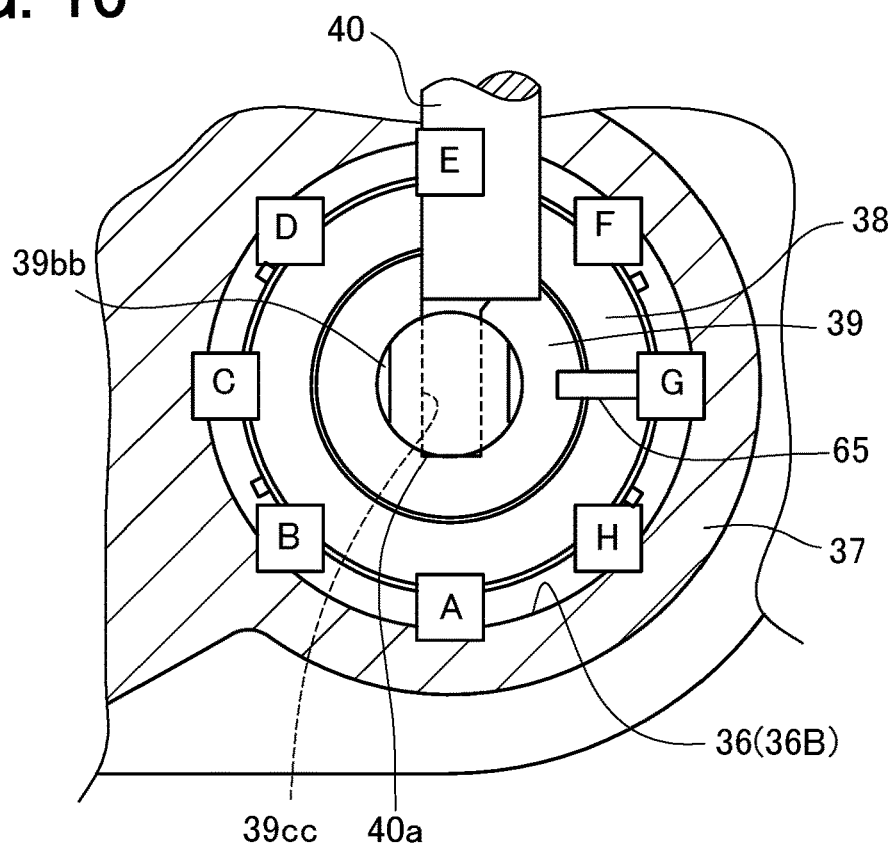
FIG. 10 is a plan view showing eight different positions at which foreign matter is experimentally lodged between the valve seat and the valve element in the first embodiment.
Figure 11:
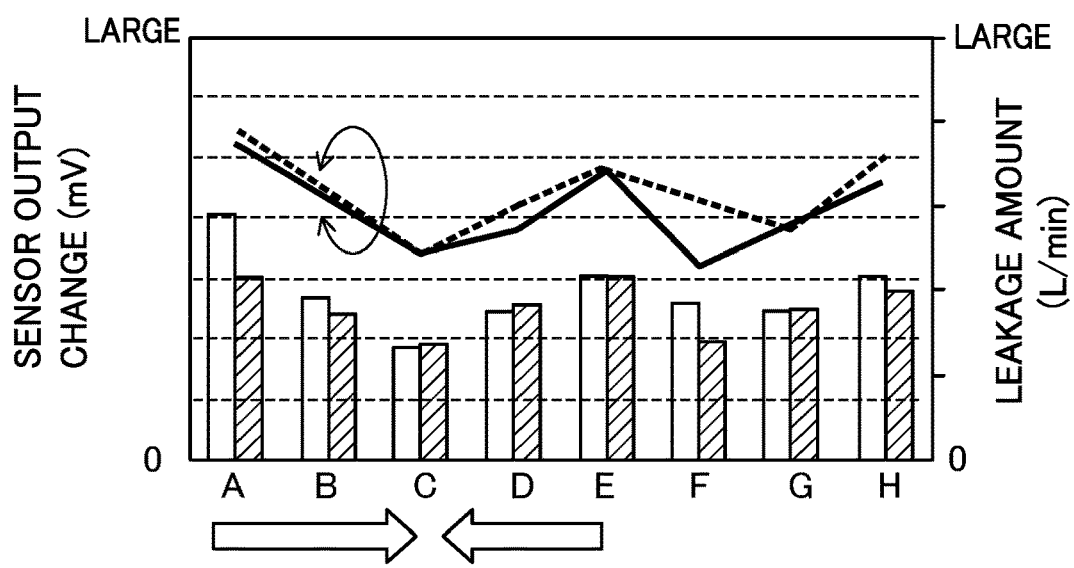
FIG. 11 is a graph showing a relationship between each lodging position of foreign matter, output variation of an opening-degree sensor, and a leakage amount in the first embodiment.

Here, a study is made on the relationship between lodging position of foreign matter on the valve seat 38, change in output of the opening-degree sensor 49, and leakage amount of EGR gas or intake air. The term "change in output of the opening-degree sensor 49" represents a difference between a sensor output obtained when a foreign matter is lodged during full close and a sensor output obtained when no foreign matter is lodged during full close (the same definition applies to the following description). FIG. 10 is a plan view showing eight different positions A, B, C, D, E, F, G, and H at which foreign matter is experimentally lodged, by changing its lodging position, between the valve seat 38 and the valve element 39 of the EGR valve 24 in the present embodiment. In FIG. 10, the position G matches the position of the valve-closing stopper 65. The position A and the position E align with the axis line of the pin 40a of the rotary shaft 40. FIG. 11 is a graph showing a relationship between the foreign-matter lodging positions A to H, output change of the opening-degree sensor 49 (line chart), and leakage amount of EGR gas or intake air (bar chart). FIG. 11 shows measurement results of the sensor output change and the leakage amount due to lodging of foreign matter at each of the positions A to H. Specifically, FIG. 11 shows the results obtained by measuring each of the sensor output change due to lodging and the leakage twice at every position A to H. As seen in this graph, as it is farther from the valve-closing stopper 65 (the position G), that is, as it is closer to the position C, the leakage amount is smaller and the sensor output change is small. Here, the sensor output change is proportional to the opening degree of the valve element 39. The reason why the sensor output change and the leakage amount are large at the positions A and E is that the rotary shaft 40 at those positions disturbs returning of the valve element 39.

Figure 12:
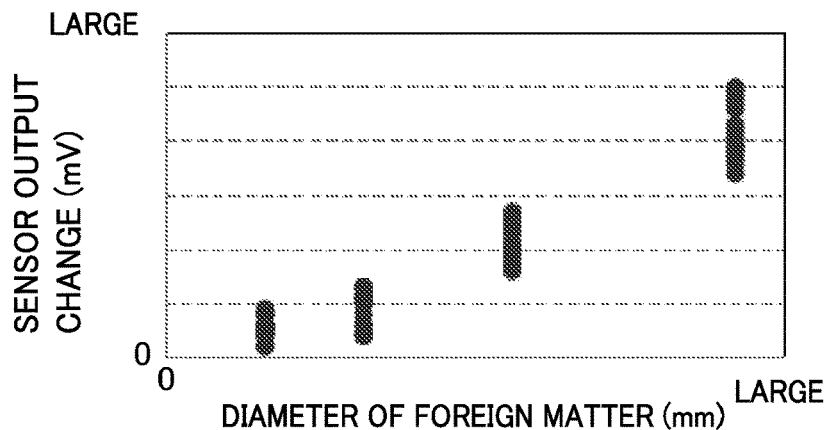
FIG. 12 is a graph showing a relationship between foreign matter diameter and sensor output change in the first embodiment.
Figure 13:
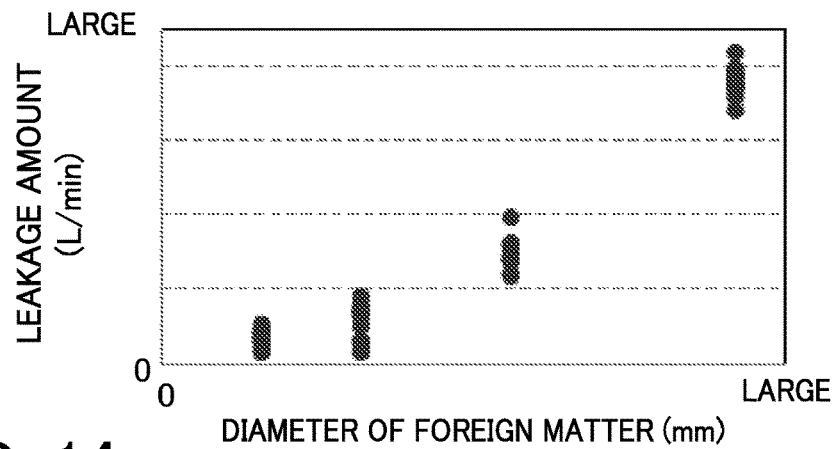
FIG. 13 is a graph showing a relationship between foreign matter diameter and leakage amount in the first embodiment.
Figure 14:
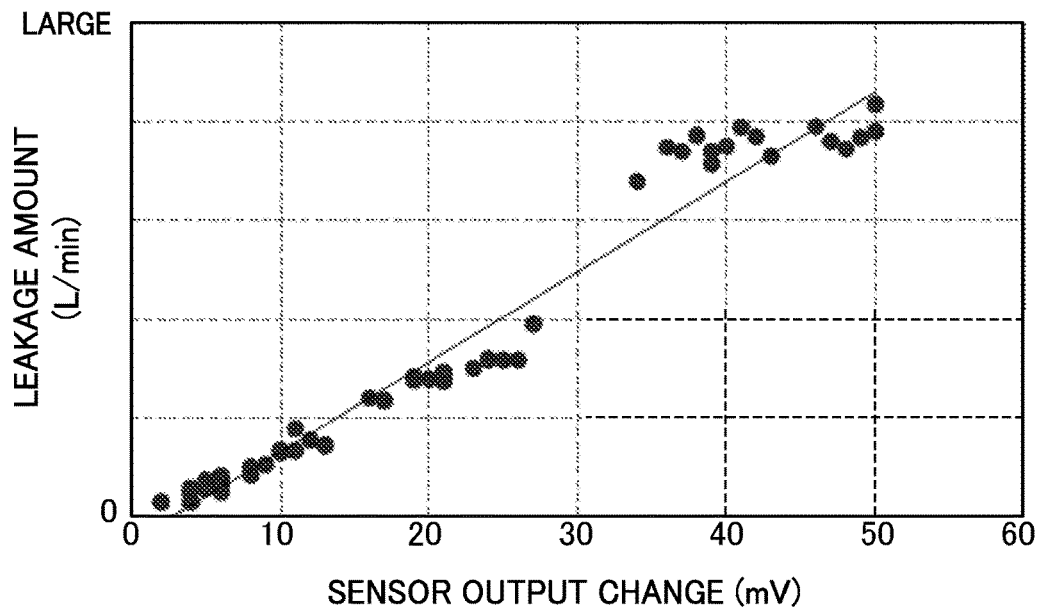
FIG. 14 is a graph showing a relationship between sensor output change and leakage amount in the first embodiment.

Another study is made on the relationship between size of foreign matter diameter and change in output of the opening-degree sensor 49 or leakage amount of EGR gas or intake air. FIG. 12 is a graph showing the relationship between foreign matter diameter and sensor output change. Specifically, FIG. 12 shows the results obtained by measuring sensor output for the same foreign matter diameter more than once. In this experiment, the DC motor 42 of the EGR valve 24 is controlled to be energized at a duty cycle of 10% (Duty=10%) to urge the valve element 39 to rotate in the valve closing direction. On the other hand, FIG. 13 is a graph showing the relationship between foreign matter diameter and leakage amount. Specifically, FIG. 13 shows the results obtained by measuring leakage amount for the same foreign matter diameter more than once. In this experiment, the measurement is conducted under an intake negative pressure of 66.7 kPa. As shown in FIGS. 12 and 13, the foreign matter diameter, the sensor output change, and the leakage amount intercorrelate with one another. Therefore, FIG. 14 is a graph showing the relationship between sensor output change and leakage amount regarding lodging of minute-diameter foreign matter. The graph of FIG. 14 is created based on data in FIGS. 12 and 13. FIG. 14 reveals that the sensor output change and the leakage amount regarding lodging of minute-diameter foreign matter linearly correlate with each other.

Figure 15:
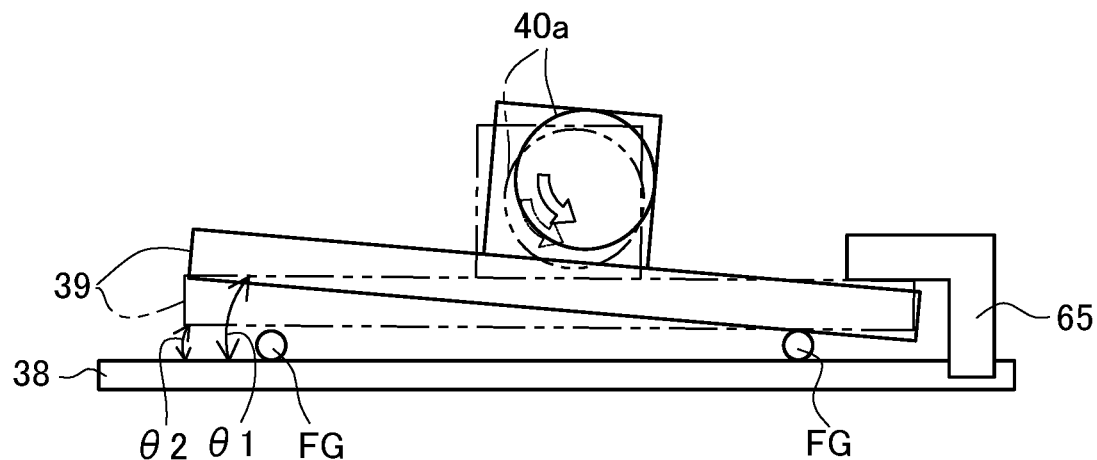
FIG. 15 is a schematic view showing a relationship between lodging positions of foreign matter and opening degree due to lodging foreign matter during full close in the first embodiment.
Figure 16:
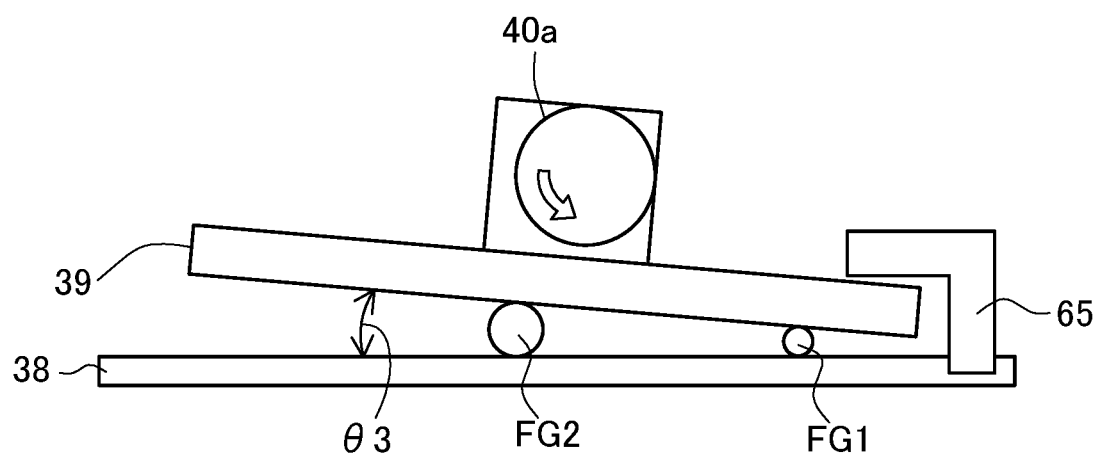
FIG. 16 is a schematic view showing a relationship between lodging of different-diameter foreign matter and opening degree due to lodging foreign matter during full close in the first embodiment.

It is ascertained from the aforementioned results of the study that the foreign-matter lodging positions and the foreign matter diameters have the following tendency. FIG. 15 is a schematic diagram showing the relationship between the foreign-matter lodging positions and opening degrees θ1 and θ2 of the valve element 39 during full close in the presence of lodging foreign matter, which are hereinafter referred to as lodging opening degrees θ1 and θ2. As seen in FIG. 15, when the foreign matters FG are equal in size, the lodging opening degree θ1 formed by the foreign matter FG lodged at a position close to the valve-closing stopper 65 is larger than the lodging opening degree θ2 formed by the foreign matter FG lodged at a position far from the valve-closing stopper 65. FIG. 16 is a schematic view showing the relationship between lodging of foreign matter and a lodging opening degree θ3 of the valve element 39 during full close. As seen in FIG. 16, when a foreign matter FG1 and a foreign matter FG2 are different in size, the same opening degree θ3 may be formed even by the foreign matter FG1 and the foreign matter FG2 lodged at different positions.

Figure 17:
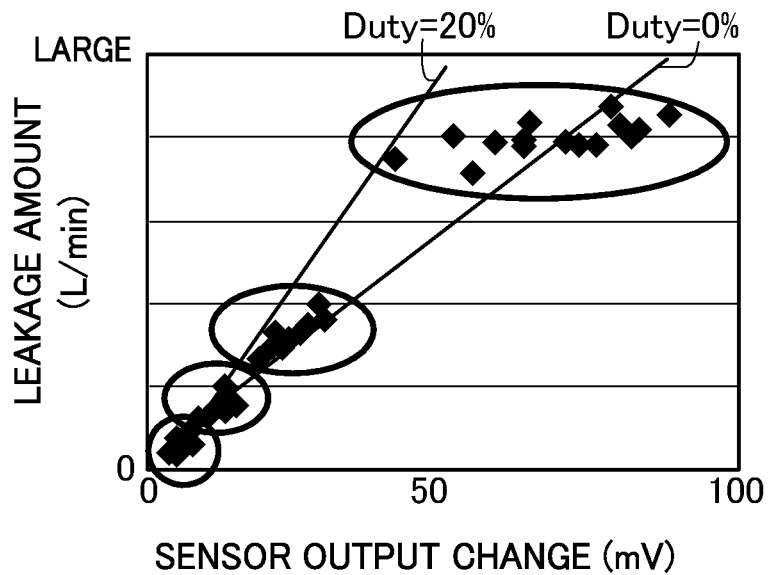
FIG. 17 is a graph showing a relationship between sensor output change and leakage amount, built up when a DC motor and others do not perform a rotation urging operation in a valve closing direction in the first embodiment.
Figure 18:
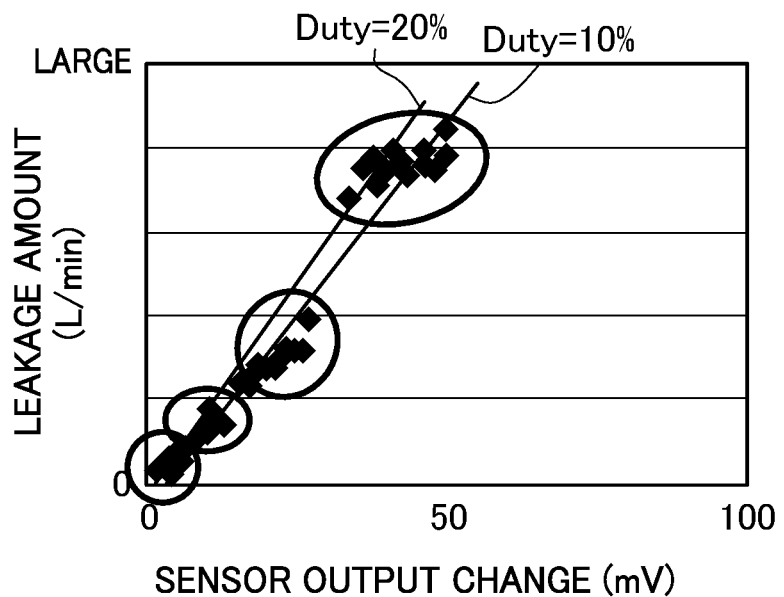
FIG. 18 is a graph showing a relationship between sensor output change and leakage amount, built up when a DC motor and others performs the rotation urging operation in a valve closing direction in the first embodiment.
Figure 19:
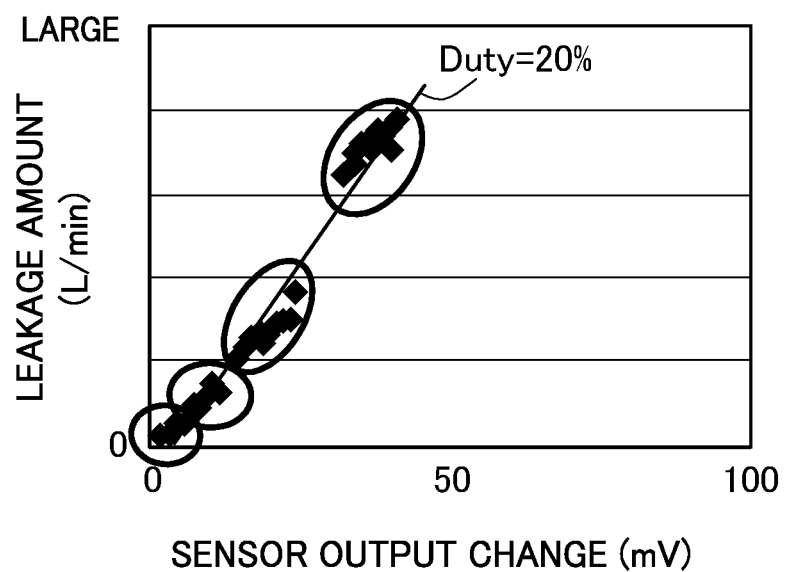
FIG. 19 is a graph showing a relationship between sensor output change and leakage amount, built up when a DC motor and others urge the valve element rotation in a valve closing direction in the first embodiment.

Next, a further study is made on the relationship between magnitude of current applied to the DC motor 42 and lodging of foreign matter in the EGR valve 24 when the valve element 39 is urged to rotate in the valve closing direction by the return spring 50 and additionally urged to rotate in the valve closing direction by the DC motor 42 and others during full close. FIG. 17 is a graph showing a relationship between sensor output change and leakage amount when the rotation urging operation in the valve closing direction by the DC motor 42 and others is not performed (Current applied to the DC motor 42: Duty=0%). FIG. 18 is a graph showing the relationship between sensor output change and leakage amount when the rotation urging operation in the valve closing direction by the DC motor 42 and others is performed (Current applied to the DC motor 42: Duty=10%). FIG. 19 is a graph showing the relationship between sensor output change and leakage amount when the rotation urging operation in the valve closing direction by the DC motor 42 and others is performed (Current applied to the DC motor 42: Duty=20%). In this experiment, the diameters of foreign matters lodged between the valve seat 38 and the valve element 39 are set different and the sensor output change and the leakage amount are measured more than one time. As seen in FIGS. 17 to 19, for every foreign matter diameter, as the current applied to the DC motor 42 is increased, the leakage amount becomes smaller and the sensor output change at the same leakage amount lesser varies.

Here, the variation of sensor output change is deteriorated, or wider, as the current applied to the DC motor 42 is lower. This is conceivable as the rotation urging force to urge the valve element 39 to rotate in the valve closing direction is weaker as the applied current is lower, so that the floating state of the valve element 39 from the valve seat 38 is different by the lodging position of foreign matter. This is because the floating state of the valve element 39 is different by a positional relationship between the foreign matter and the rotary shaft 40 even by the same relationship between the valve seat 38 and the valve element 39 at the time of lodging of foreign matter.

In contrast, the reason that the variation of sensor output change is reduced as the applied current is higher is that the influence of the rotary shaft 40 is mitigated as the applied current is increased, that is, as the rotation urging force on the valve element 39 in the valve closing direction rises. Further, the relationship between a minute foreign matter and foreign-matter opposite surfaces is stabilized at a three-point support by the valve-closing stopper 65, the foreign matter, and the valve seat 38 and the valve element 39. Thus, the lodging state of the foreign matter less varies and becomes stable. The relationship between a large-diameter foreign matter and foreign matter opposite surfaces is stabilized at a two-point support by the valve-closing stopper 65 and the foreign matter. Thus, as the rotation urging force on the valve element 39 in the valve closing direction rises, a gap between the valve seat 38 and the valve element 39 becomes stable. This results in a linear correlation between the sensor output change and the leakage amount, not with respect to the foreign matter diameter.

Figure 20:
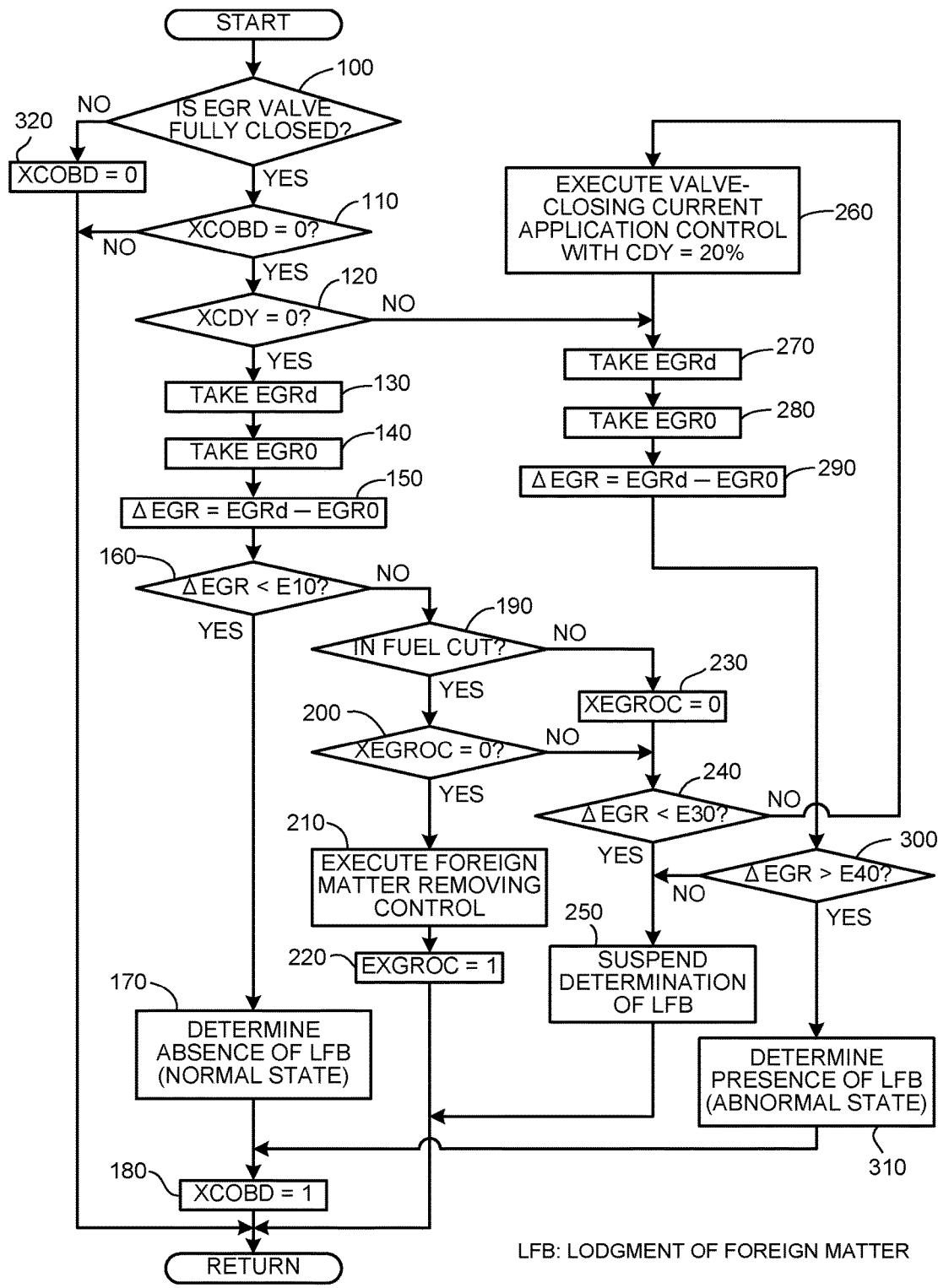
FIG. 20 is a flowchart showing contents of full-close abnormality diagnosis control in the first embodiment.

Here, the increase in current applied to the DC motor 42 leads to deterioration in power consumption and hence leads to poor fuel efficiency of the engine 1. When the rotation urging force on the valve element 39 in the valve closing direction rises, a load on the speed reducing mechanism 43 becomes large, which may damage the reliability of the EGR valve 24. In the present embodiment, therefore, only if foreign matter could have been lodged, or caught, in the EGR valve 24, the current is applied to the DC motor 42 in order to urge the valve element 39 to rotate in the valve closing direction, and full-close abnormality due to lodging of foreign matter is diagnosed. FIG. 20 is a flowchart showing contents of full-close abnormality diagnosis control to diagnose this full-close abnormality due to lodging of foreign matter.

When the process proceeds to this routine, the ECU 80 determines, in step 100, whether or not the EGR valve 24 is fully closed, that is, whether or not the EGR valve 24 is being controlled to fully close. The ECU 80 advances the process to step 110 if a result in step 100 is affirmative, i.e. YES in step 100, or alternatively, to step 320 if a result in step 100 is negative, i.e. NO in step 100.

In step 320, the ECU 80 sets a full-close abnormality diagnosis flag XCOBD to 0 and returns the process to step 100. This flag XCOBD will be set to 1 when the diagnosis for full-close abnormality has been completed or to 0 when this diagnosis is not completed yet, as will be described later.

In step 110, the ECU 80 determines whether or not the full-close abnormality diagnosis flag XCOBD is 0. The ECU 80 advances the process to step 120 if YES in step 110 or returns the process to step 100 if NO in step 110.

In step 120, the ECU 80 determines whether a valve-closing current application flag XCDY is 0. This flag XCDY will be set to 1 when current is applied to the DC motor 42 at a 20% duty cycle (Duty=20%) to thereby urge the valve element 39 to rotate in the valve closing direction or to 0 when the current is not applied to the DC motor 42. The ECU 80 advances the process to step 130 if YES in step 120 or proceeds with the process to step 270 if NO in step 120.

In step 130, the ECU 80 takes a present output of the opening-degree sensor 49 as a sensor output during full close ("full-close sensor output") EGRd. At that time, the valve element 39 of the EGR valve 24 is urged only by the return spring 50 to rotate in the valve closing direction. The full-close sensor output EGRd corresponds to one example of a full-close detection value in the present disclosure.

In step 140, subsequently, the ECU 80 takes a full-close learning output EGR0. This output EGR0 is an output (a learning value) of the opening-degree sensor 49, which has been obtained by learning when the EGR valve 24 is fully closed under a predetermined condition, namely, a full-close output to be used as a reference. Even at this learning time, the valve element 39 is also urged only by the return spring 50 to rotate in the valve closing direction. The details of this learning method are omitted here. The full-close learning output EGR0 corresponds to one example of a reference full-close detection value in the present disclosure.

In step 150, the ECU 80 then calculates a sensor output change ΔEGR by subtracting the full-close learning output EGR0 from the full-close sensor output EGRd. The sensor output change ΔEGR corresponds to one example of a detection difference in the present embodiment.

In step 160, the ECU 80 determines whether or not the sensor output change ΔEGR is smaller than a predetermined value E10. This predetermined value E10 can be assigned 10 mV, for example. The ECU 80 advances the process to step 170 if YES in step 160 or to step 190 if NO in step 160. The predetermined value E10 corresponds to one example of a second determination value in the present disclosure.

In step 170, the ECU 80 determines that no foreign matter is lodged between the valve seat 38 and the valve element 39 in the EGR valve 24 (i.e. Normal state). The ECU 80 can store this determination result in a memory.

In step 180, the ECU 80 then sets the full-close abnormality diagnosis flag XCOBD to 1 and returns the process to step 100.

In step 190 following step 160, the ECU 80 determines whether or not the engine 1 is in a fuel cut mode (i.e. during stop of fuel supply to the engine 1). The ECU 80 advances the process to step 200 if YES in step 190 or to step 230 if NO in step 190.

In step 200, the ECU 80 determines whether or not a foreign matter removal flag XEGROC is 0. This flag XEGROC will be set to 1 when foreign matter removal control has been executed on the EGR valve 24 and to 0 when this control is not executed yet, as will be described later. The ECU 80 advances the process to step 210 if YES in step 200 or to step 240 if NO in step 200.

In step 210, the ECU 80 performs the foreign matter removal control. Specifically, the ECU 80 controls the DC motor 42 to open the valve element 39 of the EGR valve 24 by an opening degree of 5° from a fully closed position and then return the valve element 39 to the fully closed position.

Thereafter, in step 220, the ECU 80 sets the foreign matter removal flag XEGROC to 1 and returns the process to step 100.

In step 230 following step 190, alternatively, the ECU 80 sets the foreign matter removal flag XEGROC to 0.

Subsequently, in step 240 following step 230 or 200, the ECU 80 determines whether or not the sensor output change ΔEGR is smaller than a predetermined value E30 (E30>E10). This predetermined value E30 can be assigned 30 mV, for example. The ECU 80 advances the process to step 250 if YES in step 240 or to step 260 if NO in step 240.

In step 250, the ECU 80 suspends the foreign-matter lodging determination and then returns the process to step 100.

Alternatively, in step 260 following step 240, the ECU 80 executes valve-closing applied-current control with a valve-closing current to be applied (hereinafter, referred to as a "valve-closing applied current") CDY with a 20% duty cycle. To be specific, the ECU 80 controls the DC motor 42 with the valve-closing applied current CDY with a 20% duty cycle in order to cause the DC motor 42 to additionally urge the valve element 39 urged for rotation by the return spring 50 to rotate in the valve closing direction.

Thereafter, in step 270 following step 120 or 260, the ECU 80 takes a present output of the opening-degree sensor 49 as the full-close sensor output EGRd as in step 130.

In step 280, the ECU 80 then takes the full-close learning output EGR0 as in step 140.

In step 290, the ECU 80 calculates a sensor output change ΔEGR by subtracting the full-close output EGR0 from the full-close sensor output EGRd.

In step 300, the ECU 80 then determines whether or not the sensor output change ΔEGR is larger than a predetermined value E40 (E40>E30). This predetermined value E40 can be assigned 40 mV, for example. The ECU 80 advances the process to step 310 if YES in step 300 or to step 250 if NO in step 300. The predetermined value E40 corresponds to one example of a first determination value in the present disclosure.

In step 310, the ECU 80 determines that foreign matter is lodged between the valve seat 38 and the valve element 39 (i.e. Abnormal state) and proceeds with the process to step 180. The ECU 80 can store this determination result in the memory. The ECU 80 can further perform a predetermined abnormality informing process as a result of this abnormality determination.

According to the aforementioned control, during full close of the valve element 39, the ECU 80 drivingly controls the DC motor 42 with the valve-closing applied current CDY (=a 20% duty cycle) to urge the valve element 39 to rotate in the valve closing direction (Valve-closing applied-current control). The ECU 80 then calculates the sensor output change ΔEGR (the detection difference) which is a difference between the full-close sensor output EGRd (the full-close detection value) detected by the opening-degree sensor 49 during driving control of the DC motor 42 and the full-close learning output EGR0 (the reference full-close detection value). If this sensor output change ΔEGR is larger than the predetermined value E40 (the first detection value), the EGR valve 24 is judged to be in an abnormal state with foreign matter lodged.

According to the aforementioned control, the ECU 80 determines the normality of the EGR valve 24 before diagnosing foreign-matter lodging abnormality by the aforementioned valve-closing applied-current control. To be concrete, the ECU 80 calculates the sensor output change ΔEGR (the detection difference) which is a difference between the full-close sensor output EGRd (full-close detection value) detected by the opening-degree sensor 49 and the full-close learning output EGR0 (a predetermined reference full-close detection value) during full close of the valve element 39 in which the valve element 39 is urged only by the return spring 50 to rotate in the valve closing direction. When the sensor output change ΔEGR is smaller than the predetermined value E10 (the second determination value), the EGR valve 24 is determined to be normal with regard to lodging of foreign matter.

Moreover, according to the aforementioned control, when determining that the EGR valve 24 is not normal regarding lodging of foreign matter by the aforementioned normality diagnosis, the ECU 80 performs the foreign matter removal control that the valve element 39 is opened and closed by the DC motor 42 in order to remove foreign matter(s).

Figure 21:
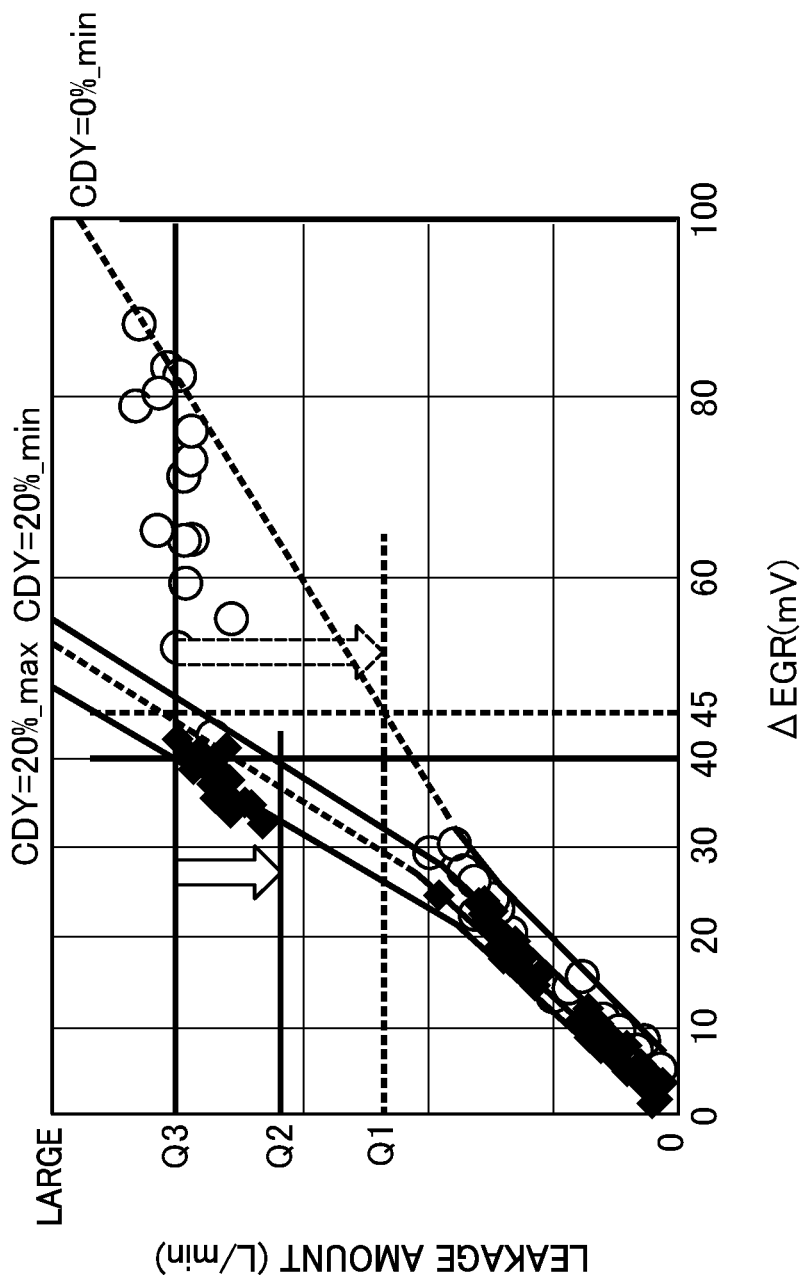
FIG. 21 is a graph showing a relationship between sensor output change and leakage amount, obtained under a predetermined intake negative pressure condition in the first embodiment.

One example of results of the aforementioned full-close abnormality diagnosis control will be explained below. FIG. 21 is a graph showing the relationship between sensor output change ΔEGR and leakage amount of EGR gas or intake air under an intake negative pressure of 66 kPa. If lodging of foreign matter is likely present, the valve-closing applied current CDY with a 20% duty cycle is applied to the DC motor 42 in order to forcibly urge the valve element 39 to rotate in the valve closing direction, and a determination for lodging of foreign matter (leakage amount of EGR gas or intake air) is performed. In FIG. 21, if the sensor output change ΔEGR is equal to or less than 10 mV for the valve-closing applied current CDY with a 0% duty cycle, the EGR valve 24 is not determined to be abnormal when the leakage amount is equal to or less than a predetermined value Q3, that is, it is determined to be normal (no lodging foreign matter). If the sensor output change ΔEGR is equal to or larger than 30 mV for the valve-closing applied current CDY with a 0% duty cycle, the valve-closing applied current CDY with a 20% duty cycle is applied to the DC motor 42 and, if the sensor output change ΔEGR is equal to or less than 40 mV, the ECU 80 suspends determination of abnormality (foreign matter lodging). If the sensor output change ΔEGR is larger than 40 mV, the ECU 80 determines that the EGR valve 24 is abnormal (lodging of foreign matter is present).

Now, as shown in FIG. 21, in the case of the valve-closing applied current CDY with a 0% duty cycle, a situation that a the leakage amount required to be detected in the presence of foreign matter lodged is the predetermined value Q3 at a minimum appears at the time when the sensor output change ΔEGR is equal to or larger than 45 mV. In this case, since a lowest leakage amount for the sensor output change ΔEGR of 45 mV is a predetermined value Q1 (Q1<Q3), abnormality inherently unnecessary to be detected may be detected if the leakage amount falls within a range smaller than the predetermined value Q3 (i.e. equal to or more than Q1 and less than Q3) (False detection). In the case of the valve-closing applied current CDY of 20%, it is the time when the sensor output change ΔEGR is larger than 40 mV. Since the smallest leakage amount for the sensor output change ΔEGR of 40 mV is a predetermined value Q2 (Q3>Q2>Q1), abnormality inherently unnecessary to be detected may be detected if the leakage amount falls within a range smaller than the predetermined value Q3 (i.e. equal to or more than Q2 and less than Q3) (False detection). By increasing the valve-closing applied current CDY from 0% to 20% as above, it is possible to improve detection accuracy of the leakage amount of EGR gas or intake air when foreign matter is lodged.

According to the full-close abnormality diagnosis apparatus for the EGR valve 24 in the present embodiment described above, during full close of the valve element 39, the ECU 80 executes the valve-closing applied-current control on the DC motor 42 to urge the valve element 39 to rotate in the valve closing direction. Thus, the valve element 39 is forcibly urged to rotate in the valve closing direction by the elastic force of the return spring 50 and additionally by the DC motor 42, thereby correcting inevitable assembling looseness (bearing looseness) for the valve element 39. Therefore, the valve element 39 in such a corrected state allows only lodging of foreign matter between the valve seat 38 and the valve element 39 to be reflected so that the opening-degree sensor 49 properly detects the full-close sensor output EGRd. Accordingly, the sensor output change ΔEGR between a proper full-close sensor output EGRd and a full-close learning output EGR0 can be properly obtained.

Thus, this proper sensor output change ΔEGR is compared with the predetermined value E40. Consequently, during full close of the valve element 39, regardless of the presence of assembling looseness (bearing looseness), abnormality due to foreign matter lodged between the valve seat 38 and the valve element 39 can be properly diagnosed.

Furthermore, the structure of the present embodiment can achieve the following operations and advantageous effects. Specifically, during full close of the valve element 39, in which the valve element 39 is urged only by the return spring 50 to rotate in the valve closing direction, the assembling looseness such as bearing looseness is not corrected. Thus, even if foreign matter is lodged or caught between the valve seat 38 and the valve element 39, the full-close sensor output EGRd detected by the opening-degree sensor 49 is small by just the assembling looseness. Accordingly, the sensor output change ΔEGR between the full-close sensor output EGRd and the full-close learning output EGR0 is smaller than the predetermined value E40. When this sensor output change ΔEGR is smaller than the predetermined value E10 smaller than the predetermined value E40, the EGR valve 24 is determined to be normal with regard to lodging of foreign matter. Thus, when this normal state is determined before the DC motor 42 is drivingly controlled (valve-closing applied-current control), the abnormality diagnosis executed by subsequently drivingly controlling the DC motor 42 is skipped. This can eliminate unnecessary driving control of the DC motor 42, resulting in reduction in frequency of use of the DC motor 42. Consequently, reduced power consumption and lowered load on the DC motor 42 and the speed reducing mechanism 43 can be achieved.

According to the structure in the present embodiment, if the EGR valve 24 is not determined to be normal with respect to lodging of foreign matter, the valve element 39 is opened from the fully closed state by the DC motor 42 under the foreign matter removal control and then closed again to the fully closed position. This operation can release once lodging of foreign matter between the valve seat 38 and the valve element 39 and remove the foreign matter therefrom. Accordingly, removal of the foreign matter by this foreign matter removal control allows the EGR valve 24 to return to a normal state with no foreign matter lodged. In this case, the EGR valve 24 can be determined to be normal with respect to the lodging of foreign matter in a next diagnosis. Thus, execution of redundant valve-closing applied-current control can be skipped.

Second Embodiment

A detailed description of a second embodiment of a full-close abnormality diagnosis apparatus for a flow control valve, which is another typical embodiment of this disclosure and applied to an EGR valve, will now be given referring to the accompanying drawings.

In the following description, identical or similar parts to those in the first embodiment are assigned the same reference numerals as those in the first embodiment. Thus, the following description will be given with a focus on differences from the first embodiment.

Figure 22:
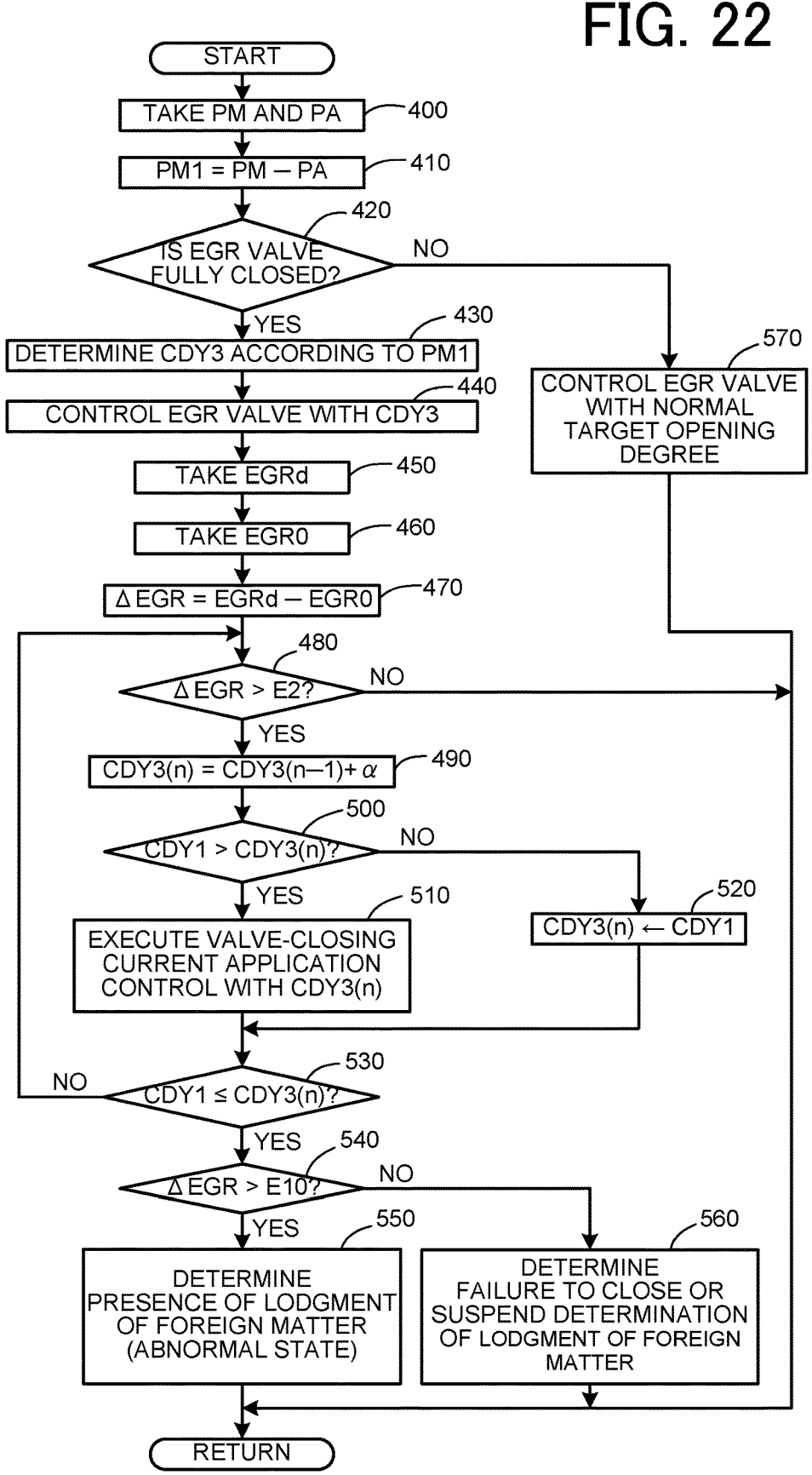
FIG. 22 is a flowchart showing contents of a full-close abnormality diagnosis control in a second embodiment.

The second embodiment differs in structure from the first embodiment about contents of the full-close abnormality diagnosis control. FIG. 22 is a flowchart showing the contents of the full-close abnormality diagnosis control. In this embodiment, the intake pressure sensor 74 and the atmospheric pressure sensor 78 correspond to a valve-opening pressure detecting unit in the present disclosure.

When the process proceeds to this routine, the ECU 80 takes, in step 400, intake pressure PM and atmospheric pressure PA respectively based on the detection values of the intake pressure sensor 74 and the atmospheric pressure sensor 78.

In step 410, the ECU 80 then calculates a relative intake pressure PM1 by subtracting the atmospheric pressure PA from the intake pressure PM. This relative intake pressure PM1 is a positive pressure and approximate to a differential pressure (front-rear differential pressure) acting on the front side and the rear side, i.e. on an upstream side and a downstream side, of the valve element 39. This relative intake pressure PM1 is the pressure that acts from the downstream-side passage 36B in a direction to open the valve element 39 placed in the fully closed state and corresponds to one example of valve-opening pressure in the present disclosure.

In step 420, the ECU 80 determines whether or not the EGR valve 24 is in a fully closed position, that is, whether or not the EGR valve 24 is being controlled to fully close. The ECU 80 advances the process to step 430 if YES in step 420 or to step 570 if NO in step 420.

In step 430, the ECU 80 determines an upper limit valve-closing applied current CDY3 according to the relative intake pressure PM1. The ECU 80 can obtain this upper limit valve-closing applied current CDY3 according to the relative intake pressure PM1 for example by referring to a valve-closing applied current map as shown in FIG. 23.

Figure 23:
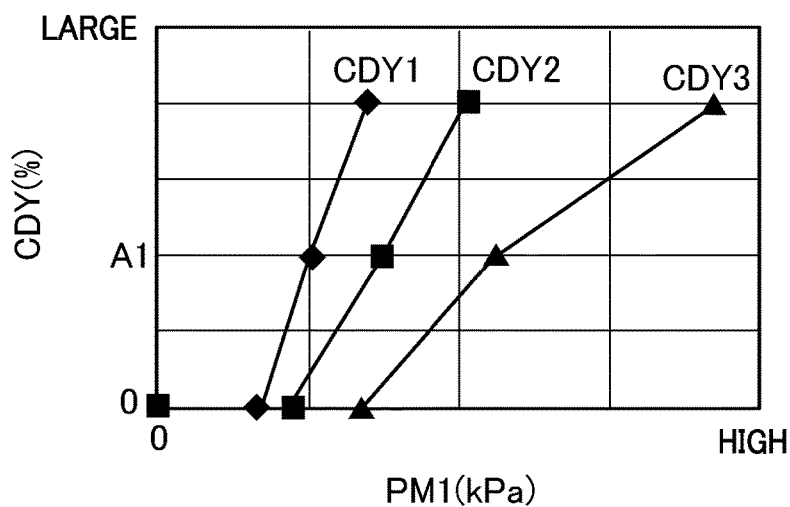
FIG. 23 is a valve-closing applied current map to be referred in order to obtain an upper limit valve-closing applied current according to a relative intake pressure in the second embodiment.

In FIG. 23, a straight line CDY1 indicates a lower limit valve-closing applied current which is a lower limit value, a straight line CDY3 represents an upper limit valve-closing applied current which is an upper limit value, and a straight line CDY2 indicates an intermediate valve-closing applied current which is an intermediate value between the upper limit value and the lower limit value. The difference between the valve-closing applied currents CDY1 to CDY3 represents a difference in valve-closing applied current CDY required to be applied according to whether the EGR valve 24 is a leaky product or a leak-proof product among inevitable variations (tolerance range). Thus, as seen in FIG. 23, at the same relative intake pressure PM1, the valve-closing applied current CDY to be applied to urge the valve element 39 to rotate in the valve closing direction against the relative intake pressure PM1 is larger in the lower limit valve-closing applied current CDY1 than in the upper limit valve-closing applied current CDY3. In other words, for the same value A1 of the valve-closing applied current CDY, when the valve element 39 is urged to rotate in the valve closing direction by that applied current, the lower limit valve-closing applied current CDY1 can counteract only a lower relative intake pressure PM1 than the upper limit valve-closing applied current CDY3. In step 430, therefore, the ECU 80 obtains the upper limit valve-closing applied current CDY3 relatively lower than other currents for a certain relative intake pressure PM1.

Figure 24:
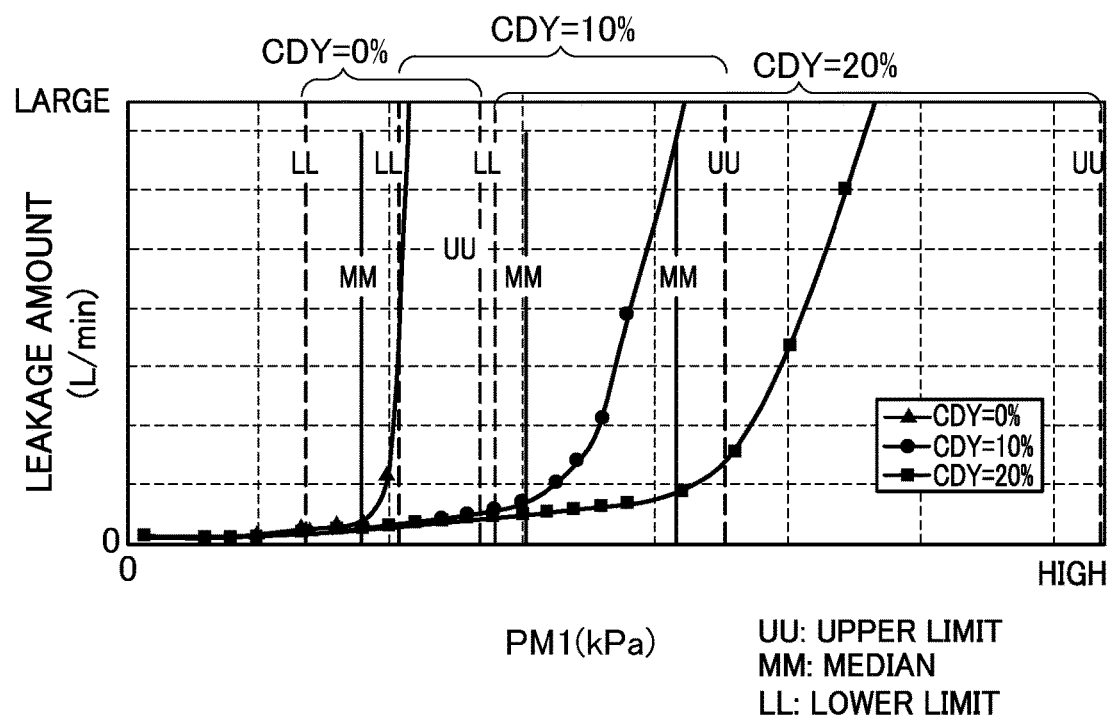
FIG. 24 is a graph showing a relationship between relative intake pressure and leakage amount of intake air in the second embodiment.

In association with FIG. 23, FIG. 24 shows, in a graph, a relationship between the relative intake pressure PM1 and the leakage amount of intake air. In FIG. 24, three curved lines individually indicate valve-closing applied currents CDY in duty cycle of 0%, 10%, and 20%, and each of the curved lines has inevitable variation (tolerance range) between a lower limit and an upper limit according to products produced as the EGR valve 24. As seen in FIG. 24, for the same valve-closing applied current CDY (e.g. 10%), the leakage amount of intake air rises up at a lower relative intake pressure PM1. Further, as seen in FIG. 24, among the different valve-closing applied currents CDY, even at their lower limits, a larger valve-closing applied current CDY delays rising of the leakage amount of intake air. Specifically, it is revealed that the EGR valve 24 can suppress leakage of intake air against even a higher relative intake pressure PM1.

In step 440, the ECU 80 controls the EGR valve 24 with the obtained upper limit valve-closing applied current CDY3. To be specific, the ECU 80 applies the upper limit valve-closing applied current CDY3 to the DC motor 42 to urge the valve element 39 to rotate in the valve closing direction.

In step 450, the ECU 80 subsequently takes a present output of the opening-degree sensor 49 as the full-close sensor output EGRd.

In step 460, the ECU 80 further takes a full-close learning output EGR0 determined by learning in advance when the EGR valve 24 is fully closed. At this learning time, the valve element 39 is urged only by the return spring 50 to rotate in the valve closing direction.

In step 470, the ECU 80 calculates the sensor output change ΔEGR by subtracting the full-close learning output EGR0 from the full-close sensor output EGRd.

In step 480, the ECU 80 determines whether or not the sensor output change ΔEGR is larger than a predetermined value E2. This predetermined value E2 can be assigned 2 mV, for example. The ECU 80 advances the process to step 490 if YES in step 480 or returns the process to step 400 if NO in step 480.

In step 490, the ECU 80 adds a predetermined value a to a previous upper limit valve-closing applied current CDY3 (n−1) calculated last time to obtain an updated upper limit valve-closing applied current CDY3(n) increased this time. This predetermined value a can be assigned e.g. 5%.

In step 500, the ECU 80 determines whether or not the increased upper valve-closing applied current CDY3(n) is smaller than the lower limit valve-closing applied current CDY1. The ECU 80 can obtain the lower limit valve-closing applied current CDY1 by referring to the valve-closing applied current map in FIG. 23. The ECU 80 proceeds with the process to step 510 if YES in step 500 or to step 520 if NO in step 500.

In step 510, the ECU 80 performs the valve-closing applied-current control with the updated upper limit valve-closing applied current CDY3(n) obtained this time as above. To be concrete, the ECU 80 controls the DC motor 42 with the updated upper limit valve-closing applied current CDY3(n) so that the valve element 39 is urged to rotate in the valve closing direction by the return spring 50 and additionally by the DC motor 42.

In step 520, alternatively, the ECU 80 sets the lower limit valve-closing applied current CDY1 to the upper limit valve-closing applied current CDY3(n). Specifically, the upper limit valve-closing applied current CDY3(n) is limited to the lower limit valve-closing applied current CDY1. Thus, the upper limit valve-closing applied current CDY3(n) will not become larger than the lower limit valve-closing applied current CDY1.

In step 530 following step 510 or 520, the ECU 80 determines whether or not the present upper limit valve-closing applied current CDY3(n) is equal to or larger than the lower limit valve-closing applied current CDY1. The ECU 80 advances the process to step 540 if YES in step 530 or returns the process to step 480 if NO in step 530.

In step 540, the ECU 80 further determines whether or not the sensor output change ΔEGR is larger than the predetermined value E10. This predetermined value E10 can be assigned 10 mV, for example. The ECU 80 advances the process to step 550 if YES in step 540 or to step 560 if NO in step 540.

In step 550, the ECU 80 determines that the lodging of foreign matter is present, that is, foreign matter is caught, between the valve seat 38 and the valve element 39 in the EGR valve 24 (Abnormal state), and returns the process to step 400. The ECU 80 can store this determination result in the memory. The ECU 80 can further execute a predetermined abnormality informing process as a result of this abnormality determination.

In step 560, the ECU 80 determines that the EGR valve 24 fails to close or the ECU 80 suspends the foreign-matter lodging determination, and returns the process to step 400. The ECU 80 can store this determination result in the memory.

In step 570 following step 420, alternatively, the ECU 80 controls the EGR valve 24 with a normal target opening degree, and returns the process to step 400. In the present embodiment, the ECU 80 calculates this normal target opening degree based on an operating state of the engine 1 at the time.

According to the aforementioned control, the ECU 80 drivingly controls the DC motor 42 with the upper limit valve-closing applied current CDY3 (Valve-closing applied-current control) to urge the valve element 39 to rotate in the valve closing direction during full close. The ECU 80 calculates the sensor output change ΔEGR (the detection difference) which is a difference between the full-close sensor output EGRd (the full-close detection value) detected by the opening-degree sensor 49 during the driving control and the full-close learning output EGR0 (the reference full-close detection value). If the sensor output change ΔEGR is larger than the predetermined value E10 (the first determination value), the EGR valve 24 is judged to be abnormal because of lodging of foreign matter.

According to the aforementioned control, when performing the valve-closing applied-current control on the DC motor 42, the ECU 80 supplies power to the DC motor 42 so as to gradually increase an output of the DC motor 42 up to a predetermined upper limit, that is, gradually increase the upper limit valve-closing applied current CDY3(n) to the lower valve-closing applied current CDY1. In other words, during full close of the valve element 39, the ECU 80 controls power supply to, i.e. drivingly controls, the DC motor 42 (the drive unit) with the upper limit valve-closing applied current CDY3 (drive force) according to the magnitude of the detected valve-opening pressure (the relative intake pressure PM1) in order to keep the valve element 39 in the fully closed state against the front-rear differential pressure (the valve-opening pressure).

Figure 25:
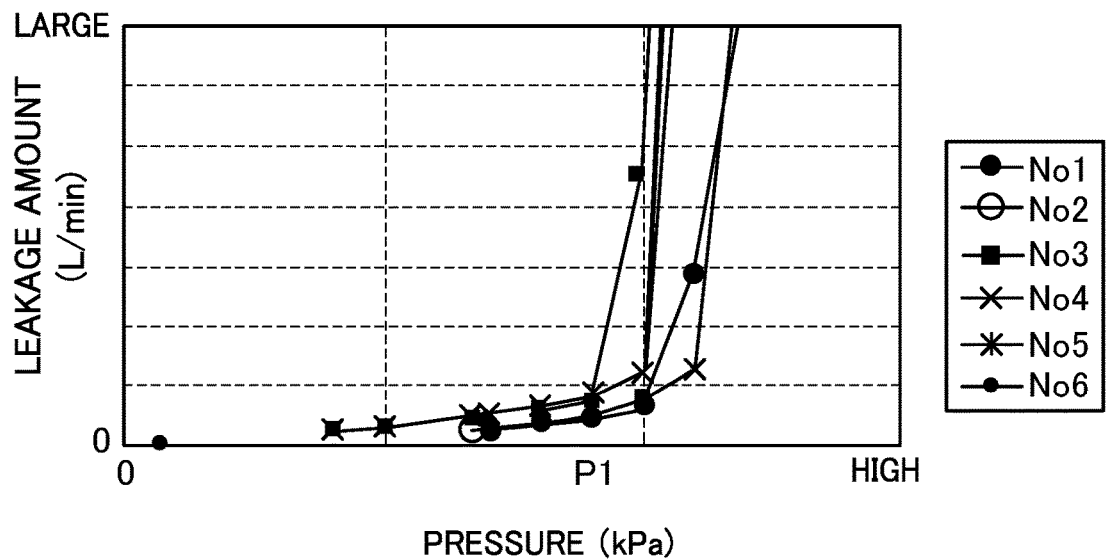
FIG. 25 is a graph showing a relationship of leakage amount of intake air to pressure in the second embodiment.
Figure 26:
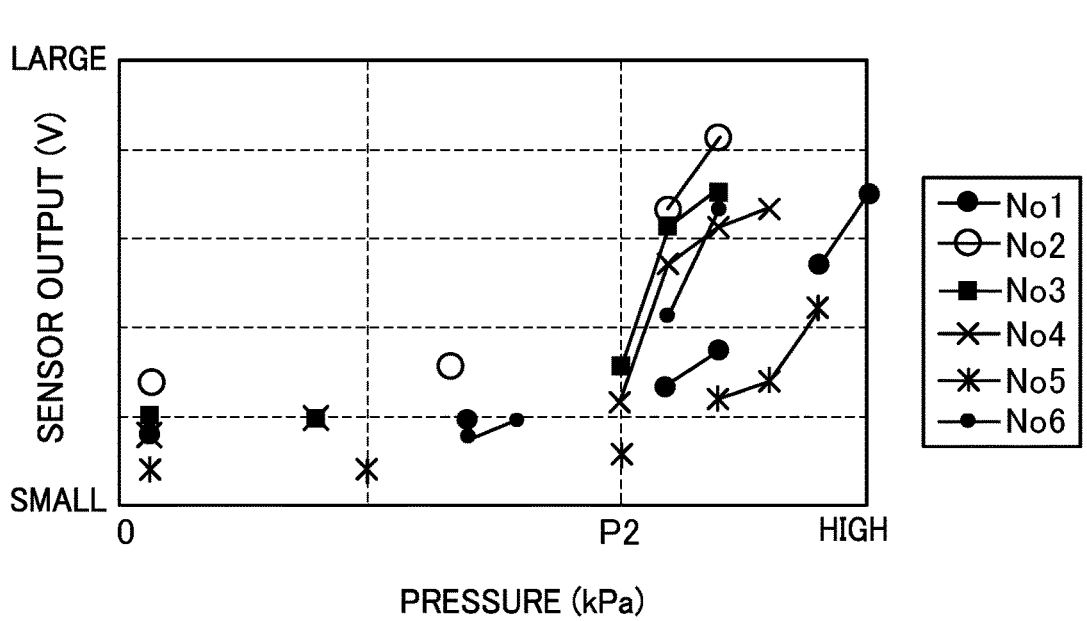
FIG. 26 is a graph showing a relationship of sensor output to pressure in the second embodiment.

According to the EGR valve 24 in the present embodiment, during its full-close (i.e. while the valve element 39 is urged only by the return spring 50 to rotate in the valve closing direction; valve-closing applied current CDY=0%), if the supercharging pressure becomes excessive, that is, if the relative intake pressure PM1 becomes high, the valve element 39 is slightly floated up, or slightly opened, from the valve seat 38 by bearing looseness, intake air may leak from between the valve seat 38 and the valve element 39. At that time, the slight opening of the valve element 39 is found in the output of the opening-degree sensor 49 (sensor output). The relationships of the intake leakage amount and the sensor output to the supercharging pressure are established as shown in FIGS. 25 and 26. FIG. 25 is a graph showing the relationship of leakage amount to pressure and FIG. 26 is a graph showing the relationship of sensor output to pressure.

In FIGS. 25 and 26, a plurality of curved lines Nos. 1 to 6 represent different measurement data. FIG. 25 reveals that the pressure exceeding about a predetermined value P1 causes the leakage amount to steeply rise. FIG. 26 reveals that the pressure exceeding about a predetermined value P2 (P2>P1) causes the sensor output to suddenly rise.

Here, the slight opening of the valve element 39 during full close can be judged by the sensor output change ΔEGR. According to the aforementioned control, therefore, the ECU 80 obtains the relative intake pressure PM1 when the intake pressure PM becomes a positive pressure (supercharging pressure) and, during full close of the EGR valve 24, controls the DC motor 42 with the upper limit valve-closing applied current CDY3 corresponding to the obtained relative intake pressure PM1. Thus, the valve element 39 is urged to rotate in the valve closing direction and kept in the fully closed state against the supercharging pressure. In this control, when causing the DC motor 42 to urge the valve element 39 for rotation in the valve closing direction, the ECU 80 determines the upper limit valve-closing applied current CDY3(n) increased according to the magnitude of the detected relative intake pressure PM1, and controls power supply to the DC motor 42 with the determined upper limit valve-closing applied current CDY3(n). To be specific, the DC motor 42 is controlled to be energized in response to the floating degree, i.e. the degree of slight opening, of the valve element 39 caused by the relative intake pressure PM1. Accordingly, the DC motor 42 is not controlled to be energized from the start of diagnosis with an excessive valve-closing applied current CDY. This can prevent unnecessary power consumption in controlling energization of the DC motor 42.

According to the full-close abnormality diagnosis apparatus for the EGR valve 24 in the present embodiment described above, during full close of the valve element 39, the ECU 80 performs the valve-closing applied-current control on the DC motor 42 to urge the valve element 39 to rotate in the valve closing direction. Thus, the valve element 39 is forcibly urged to rotate in the valve closing direction by the elastic force of the return spring 50 and additionally by the DC motor 42, thereby correcting bearing looseness inevitable for the valve element 39. In such a corrected state, the full-close sensor output EGRd reflecting only lodging of foreign matter between the valve seat 38 and the valve element 39 can be properly detected by the opening-degree sensor 49. Thus, a proper sensor output change ΔEGR can be obtained between the proper full-close sensor output EGRd and the full-close learning output EGR0, and the obtained proper sensor output change ΔEGR is compared with the predetermined value E10. Consequently, during full close of the valve element 39, the abnormality due to lodging of foreign matter between the valve seat 38 and the valve element 39 can be properly diagnosed regardless of the presence of assembling looseness (bearing looseness).

According to the structure of the present embodiment, when the DC motor 42 is subjected to the valve-closing applied-current control, the DC motor 42 is controlled by the valve-closing applied-current control to gradually increase the output of the DC motor 42 to a predetermined upper limit, that is, to gradually increase the upper limit valve-closing applied current CDY3(n) to the lower limit valve-closing applied current CDY1. Therefore, the output of the DC motor 42 does not need to be increased more than necessary from the start of diagnosis. Accordingly, it is possible to reduce unnecessary power consumption in the valve-closing applied-current control on the DC motor 42 to forcibly urge the valve element 39 to rotate in the valve closing direction.

Third Embodiment

A detailed description of a third embodiment of a full-close abnormality diagnosis apparatus for a flow control valve, which is another typical embodiment of this disclosure and applied to an EGR valve, will now be given referring to the accompanying drawings.

Even when a poppet valve, not the double eccentric valve, is adopted as the EGR valve, similar problems with lodging of foreign matter to the case of using the double eccentric valve are conceived. In the third embodiment, therefore, the case of using the poppet valve as the EGR valve will be described below.

Figure 27:
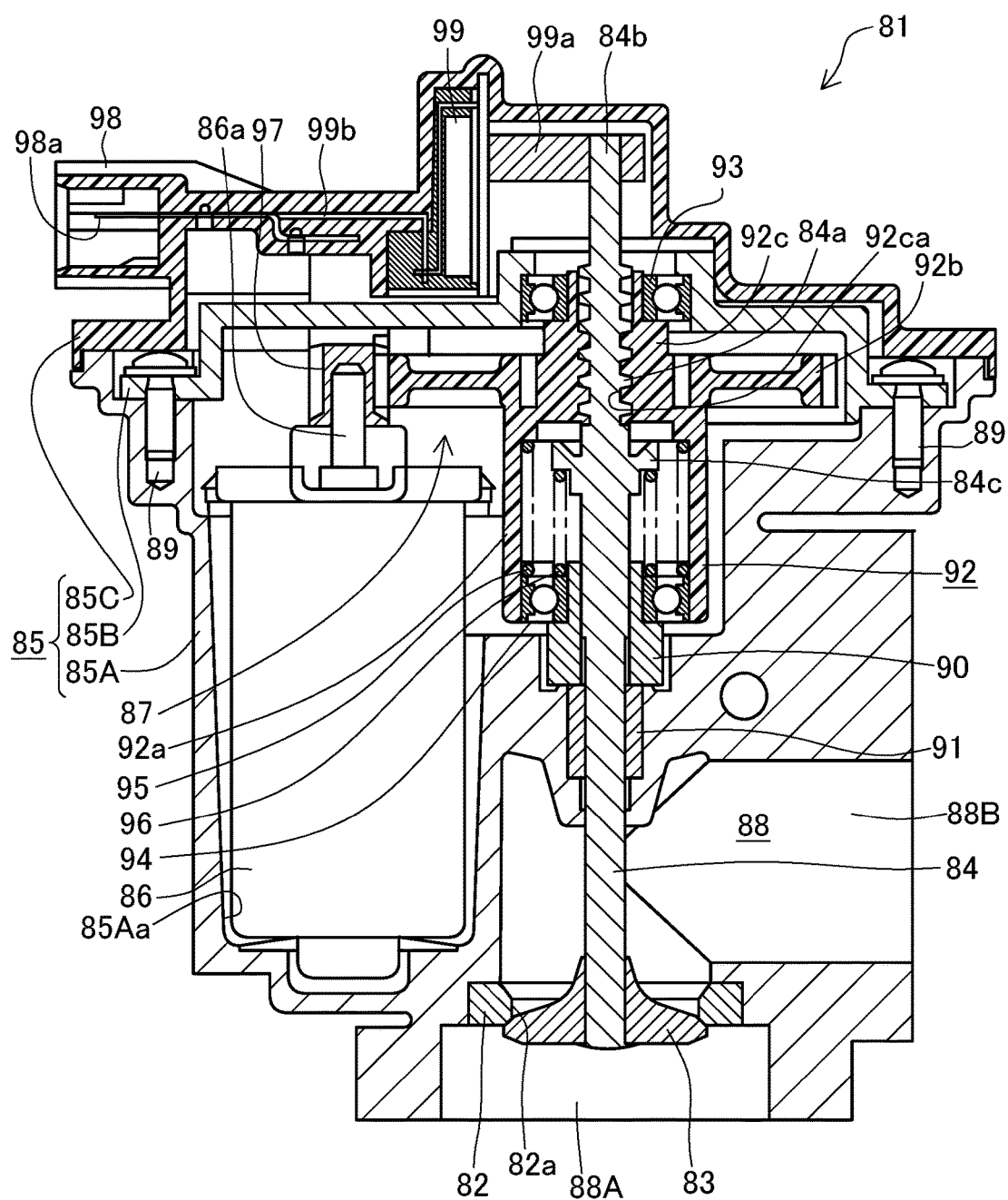
FIG. 27 is a cross sectional view showing a EGR valve including a DC motor type poppet valve in a third embodiment.

FIG. 27 is a cross sectional view of an EGR valve 81 including a DC motor type poppet valve in the third embodiment. As shown in FIG. 27, the EGR valve 81 is provided, as main components, a DC motor 86 and a speed reducing mechanism 87 in addition to a valve seat 82, a valve element 83, and a valve shaft 84. The housing 85 includes a valve housing 85A made of aluminum including a flow passage 88, a lid 85B that is made of aluminum and closes an open end of the valve housing 85A, and an end frame 85C that is made of synthetic resin, or plastic, and covers an upper side of the lid 85B. The lid 85B is fixed to the valve housing 85A with screws 89. The end frame 85C is fixed to the valve housing 85A with a plurality of clips (not shown). In the present embodiment, as one example, the valve shaft 84, the DC motor 86, and the speed reducing mechanism 87 constitute a drive unit in the present disclosure.

The valve seat 82 is provided in a flow passage 88. This flow passage 88 includes an upstream-side passage 88A and a downstream-side passage 88B partitioned at the valve seat 82. The valve element 83 is fixed to a lower end of the valve shaft 84. This valve shaft 84 rectilinearly reciprocates, or moves in strokes, to open and close the valve element 83 with respect to the valve seat 82. In the present embodiment, in the upstream-side passage 88A, the valve element 83 is placed to be seatable on the valve seat 82. The valve shaft 84 is supported, at its middle part, by the valve housing 85A through a thrust bearing 90. Under the thrust bearing 90, i.e. on the flow passage 88 side, a seal member 91 is provided between the valve housing 85A and the valve shaft 84.

A rotary element 92 is provided so as to surround an upper portion of the valve shaft 84. This rotary element 92 includes a cylindrical part 92a internally holding a part of the valve shaft 84, a gear part 92b provided on an outer circumference of the upper portion of the cylindrical part 92a, and a female screw part 92c provided in the center of the cylindrical part 92a and centrally formed with internal threads 92ca. The rotary element 92 is rotatably supported by the valve housing 85A and the lid 85B through a first radial bearing 93 and a second radial bearing 94 arranged respectively at upper and lower ends of the rotary element 92. The first radial bearing 93 is placed between the lid 85B and the female screw part 92c. The second radial bearing 94 is placed between a lower internal circumferential wall of the cylindrical part 92a and the thrust bearing 90. External threads 84a threadedly engageable with the internal threads 92ca are provided on an outer circumference of the upper portion of the valve shaft 84. The valve shaft 84 is provided with a pin 84b protruding upward from an upper end of the external threads 84a. The valve shaft 84 is also provided with a spring retainer 84c below the external threads 84a. Inside the cylindrical part 92a, a holding spring 95 is provided between the second radial bearing 94 and the cylindrical part 92a to urge the cylindrical part 92a upward in order to retain the rotary element 92 with respect to the valve housing 85A and the lid 85B. Further, inside the holding spring 95, a valve-closing spring 96 is provided between the second radial bearing 94 and the spring retainer 84c to urge the valve shaft 84 upward, that is, in a valve closing direction to bring the valve element 83 into contact with the valve seat 82. The valve-closing spring 96 corresponds to one example of a valve-closing urging unit in the present disclosure.

The DC motor 86 is placed in and fixed to a cavity 85Aa of the valve housing 85A with screws or the like. On an output shaft 86a protruding upward from the DC motor 86, a motor gear 97 is fixed. The motor gear 97 is coupled to the gear part 92b to rotate the rotary element 92. Thus, when driven, the DC motor 86 causes the rotary element 92 to rotate through the motor gear 97 and the gear part 92b, thereby allowing the valve shaft 84 to move in strokes, or reciprocate, while rotating by threadable engagement between the internal threads 92ca and the external threads 84a. This stroke movement of the valve shaft 84 causes the valve element 83 to open and close with respect to the valve seat 82. For instance, rotation of the output shaft 86a of the DC motor 86 may be set so that the valve element 83 is opened by normal rotation of the output shaft 86a and is closed by reverse rotation of the same. In the present embodiment, as one example, the motor gear 97 and the gear part 92b constitute the speed reducing mechanism 87.

The valve seat 82 has a circular ring shape and includes a valve hole 82a in the center. The valve element 83 has a nearly truncated cone shape and an outer circumference portion formed to be seatable on the valve seat 82. The upstream-side passage 88A is connected to the exhaust passage through the EGR passage. The downstream-side passage 88B is connected to the intake passage through the EGR passage. In the present embodiment, the valve seat 82 is provided to be engageable with the valve element 83 to restrain the valve element 83 in the fully closed state from further moving in the valve closing direction. This structure corresponds to one example of a valve-closing restraining unit.

The end frame 85C is provided with a connector 98 for wiring. Inside the end frame 85C, an opening-degree sensor 99 is placed to detect an opening degree (a valve opening degree) of the valve element 83. Further, a magnet piece 99a is fixed on the pin 84b. A terminal 98a of the connector 98 is connected to a wire 99b of the opening-degree sensor 99. Thus, when the valve shaft 84 is moved upward and downward by an opening and closing operation (upward and downward movement) of the valve element 83, the magnet piece 99a is moved upward and downward together with the pin 84b. At that time, the opening-degree sensor 99 detects, as the valve opening degree, a magnetic field change associated with the positional change of the magnet piece 99a. The opening-degree sensor 99 corresponds to one example of an opening-degree detecting unit in the present disclosure.

In the present embodiment, in the gasoline engine system shown in FIG. 1, the EGR valve 81 is incorporated in place of the EGR valve 24. Specifically, when the valve element 83 is in a fully closed state and a high supercharging pressure acts on the downstream-side passage 88B, the ECU 80 drivingly controls the DC motor 86 to further urge the valve element 83 in the valve closing direction (upward in FIG.

27) from the fully closed state. This structure corresponds to another example of the valve-closing urging unit in the present disclosure.

According to the full-close abnormality diagnosis apparatus for the EGR valve 81 in the third embodiment described above, the valve element 83 in the fully closed state is restrained from moving in the valve closing direction (upward in FIG. 27) by engagement with the valve seat 82. In this fully closed state, the valve element 83 is also urged by the valve-closing spring 96 in the valve closing direction. Therefore, even if somewhat intake pressure (positive pressure) acts on the downstream-side passage 88B, the valve element 83 is kept in the fully closed state and is restrained from floating, or separating, from the valve seat 82. Furthermore, when the valve element 83 is in the fully closed state and the high supercharging pressure acts on the downstream-side passage 88B, the ECU 80 controls the DC motor 86 to further urge the valve element 83 in the valve closing direction. Thus, even if the high supercharging pressure acts on the valve element 83 positioned in the fully closed state, the valve element 83 is restrained from floating from the valve seat 82 and remains in contact with the valve seat 82. This seals between the valve element 83 and the valve seat 82 even if the high supercharging pressure acts on the valve element 83 during full close, thereby preventing leakage of intake air from between the valve element 83 and the valve seat 82. Moreover, the valve-closing spring 96 and the DC motor 86 are operated in combination to prevent floating of the valve element 83 due to supercharging pressure. Therefore, each component 86 and 96 does not need to be increased in size and performance. This can achieve a compact and low-cost EGR valve 81.

The foregoing embodiments are mere examples and give no limitation to the present disclosure. The present disclosure may be embodied in other specific forms without departing from the essential characteristics thereof.

(1) Each of the aforementioned embodiments adopts the full-close learning output EGR0 which is a learning value appropriately learned, as the reference full-close detection value in the present disclosure. In contrast, for a normal EGR valve, a full-close output detected by the opening-degree sensor under a certain condition can be simply adopted as the reference full-close detection value.

(2) In the first embodiment, before controlling the motor 42 to perform diagnosis of lodging abnormality, the sensor output change ΔEGR is calculated as a difference between the sensor output EGRd generated by the opening-degree sensor 49 when the valve element 39 is urged to rotate in the valve closing direction only by the return spring 50 and the full-close learning output EGR0. If the sensor output change ΔEGR is smaller than the predetermined value E10 (the second determination value), the EGR valve 24 is judged as being normal with regard to lodging of foreign matter (Normality diagnosis). The second embodiment also may be configured to perform this normality diagnosis.

(3) The first embodiment is configured such that, when the EGR valve 24 is not determined to be normal by the normality diagnosis, the foreign matter removing control is executed to cause the motor 42 to open and close the valve element 39 in order to remove foreign matter. The second embodiment also may be configured to perform this foreign matter removing control.

(4) Each of the embodiments is configured to diagnose full-close abnormality due to lodging of foreign matter during full close of the flow control valve (the EGR valves 24 and 81). Further, the same configuration also allows diagnosis of full-close abnormality not resulting from foreign matter lodging.

Herein, the second embodiment includes the following additional technique.

<Additional Technique>

A control device for a flow control valve, the flow control valve includes: a housing including a flow passage; a valve seat provided in the flow passage; a valve element provided to be seatable on the valve seat; the flow passage including an upstream-side passage and a downstream-side passage partitioned at the valve seat, and the valve element being placed in the upstream-side passage; a drive unit to drive the valve element to open and close with respect to the valve seat; a valve-closing urging unit that urges the valve element by an elastic force in a valve closing direction; an opening-degree detecting unit provided in the housing and configured to detect an opening degree of the valve element with respect to the valve seat; and a valve-opening pressure detecting unit configured to detect valve-opening pressure acting from the downstream-side passage in a direction to open the valve element, wherein the control device is configured to drivingly control the drive unit by a drive force according to the magnitude of the detected valve-opening pressure to keep the valve element in the fully closed state against the valve-opening pressure during full close of the valve element.

This additional technique provides the following operations. Specifically, when the valve element is to be urged by the drive unit in the valve-closing direction, the drive unit is drivingly controlled by the drive force according to the magnitude of the detected valve-opening pressure. To be concrete, the drive unit is drivingly controlled depending on the degree of floating (the degree of a minute opening degree) of the valve element by the valve-opening pressure. Thus, the drive unit is not drivingly controlled from the start of diagnosis by the drive force more than necessary.

The structure of this additional technique provides the following advantage. Specifically, wasteful power consumption is avoided in drivingly controlling the drive unit.

INDUSTRIAL APPLICABILITY

The present disclosure can be utilized not only in an exhaust gas recirculation apparatus provided with an exhaust gas recirculation valve but also in a system provided with a flow control valve for controlling a fluid.

REFERENCE SIGNS LIST

24 EGR valve (Flow control valve)
36 Flow passage
38 Valve seat
39 Valve element
40 Rotary shaft (Drive unit)
41 Housing
42 DC motor (Drive unit)
43 Speed reducing mechanism (Drive unit)
49 Opening-degree sensor (Opening-degree detecting unit)
50 Return spring (Valve-closing urging unit)
74 Intake pressure sensor (Valve-opening pressure detecting unit)
78 Atmospheric pressure sensor (Valve-opening pressure detecting unit)
80 ECU (Abnormality diagnosis unit)
81 EGR valve (Flow control valve)
82 Valve seat 83 Valve element
84 Valve shaft (Drive unit)
85 Housing
86 DC motor (Drive unit)
87 Speed reducing mechanism (Drive unit)
88 Flow passage
96 Valve-closing spring (Valve-closing urging unit)
99 Opening-degree sensor (Opening-degree detecting unit)
EGRd Full-close sensor output (Full-close detection value)
EGR0 Full-close learning output (Reference full-close detection value)
ΔEGR Sensor output change (Detection difference)

What is claimed is:

1. A full-close abnormality diagnosis apparatus for diagnosing abnormality in a flow control valve during full close, the flow control valve comprising:
a housing including a flow passage;
a valve seat provided in the flow passage;
a valve element provided to be seatable on the valve seat;
a drive unit configured to drive the valve element to open and close with respect to the valve seat;
a valve-closing urging unit that urges the valve element in a valve closing direction by an elastic force; and
a sensor provided in the housing and configured to detect an opening degree of the valve element with respect to the valve seat,
wherein the full-close abnormality diagnosis apparatus comprises a processor programmed to diagnose foreign-matter lodging abnormality in which foreign matter is lodged between the valve seat and the valve element during full close of the valve element, and
wherein when the valve element is to be urged in the valve closing direction by only the valve-closing urging unit during full close of the valve element, if the foreign-matter lodging abnormality in the flow control valve is estimated by comparing a detection difference between a full-close detection value detected by the sensor and a predetermined reference full-close detection value with a predetermined determination value smaller than a first predetermined determination value, the processor is programmed to:
drivingly control the drive unit to urge the valve element in the valve closing direction, and
determine that the flow control valve is abnormal because of lodging of the foreign matter when the detection difference between the full-close detection value detected by the sensor during driving control of the drive unit and the predetermined reference full-close detection value is larger than the first predetermined determination value.

2. The full-close abnormality diagnosis apparatus for a flow control valve according to claim 1, wherein
during full close of the valve element, in which the valve element is urged in the valve closing direction only by the valve-closing urging unit, the processor determines that the flow control valve is normal with regard to lodging of foreign matter when the detection difference between the full-close detection value detected by the sensor and the reference full-close detection value is smaller than a predetermined second determination value that is smaller than the first predetermined determination value.

3. The full-close abnormality diagnosis apparatus for a flow control valve according to claim 2, wherein
when the flow control valve is not determined to be normal with regard to lodging of foreign matter, the processor operates the drive unit to open and close the valve element to remove the foreign matter.

4. The full-close abnormality diagnosis apparatus for a flow control valve according to claim 1, wherein
when drivingly controlling the drive unit to urge the valve element in the valve closing direction, the processor drivingly controls the drive unit so as to gradually increase an output of the drive unit up to a predetermined upper limit value.

5. The full-close abnormality diagnosis apparatus for a flow control valve according to claim 1, wherein
the flow passage includes an upstream-side passage and a downstream-side passage partitioned at the valve seat,
the valve element is placed in the upstream-side passage,
the full-close abnormality diagnosis apparatus further comprises a pressure sensor configured to detect a valve-opening pressure acting on the valve element from the downstream-side passage in a direction to open the valve element, and
the processor drivingly controls the drive unit by a drive force according to a magnitude of the detected valve-opening pressure during full close of the valve element to keep the valve element in a fully closed state against the valve-opening pressure.

* * * * *